(12) United States Patent
Islam et al.

(10) Patent No.: US 12,256,401 B2
(45) Date of Patent: Mar. 18, 2025

(54) INDICATING START AND STOP SYMBOLS OF PDSCH AND PUSCH THROUGH PDCCH

(71) Applicant: QUALCOMM Incorporated, San Diego, CA (US)

(72) Inventors: Muhammad Nazmul Islam, Littleton, MA (US); Tao Luo, San Diego, CA (US); Sundar Subramanian, San Diego, CA (US); Bilal Sadiq, Basking Ridge, NJ (US); Juergen Cezanne, Ocean Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 17/454,040

(22) Filed: Nov. 8, 2021

(65) Prior Publication Data
US 2022/0061035 A1    Feb. 24, 2022

Related U.S. Application Data

(63) Continuation of application No. 15/365,893, filed on Nov. 30, 2016, now Pat. No. 11,477,771.
(Continued)

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0044* (2013.01); *H04L 5/0048* (2013.01);
(Continued)

(58) Field of Classification Search
CPC ..... H04W 72/23; H04W 72/21; H04W 76/27; H04W 88/02; H04L 5/0044; H04L 5/0048;
(Continued)

(56) References Cited

U.S. PATENT DOCUMENTS 9,014,082 B2    4/2015    Kim et al.
9,198,176 B2    11/2015   Kim et al.
(Continued)

FOREIGN PATENT DOCUMENTS

CN    101442355 A    5/2009
CN    102379152 A    3/2012
(Continued)

OTHER PUBLICATIONS

CN106992847A, publication of CN-201610038891.9, English translation (Year: 2016).
(Continued)

*Primary Examiner* — Sharmin Chowdhury
(74) *Attorney, Agent, or Firm* — Arent Fox Schiff LLP

(57) ABSTRACT

The present disclosure relates to wireless communication in mmW networks. The apparatus may be a base station. The apparatus may be configured to determine a first symbol index and a second symbol index associated with downlink resources allocated to a UE. The first symbol index may indicate when the downlink resources begin in a subframe, and the second symbol index may indicate when the downlink resources end in the subframe. The apparatus may be configured to transmit an indication of the first symbol index and the second symbol index to the UE.

30 Claims, 16 Drawing Sheets

Related U.S. Application Data

(60) Provisional application No. 62/318,707, filed on Apr. 5, 2016.

(51) Int. Cl.
*H04W 72/21* (2023.01)
*H04W 76/27* (2018.01)
*H04L 5/14* (2006.01)
*H04W 88/02* (2009.01)

(52) U.S. Cl.
CPC .......... *H04L 5/0053* (2013.01); *H04L 5/0091* (2013.01); *H04W 72/21* (2023.01); *H04W 76/27* (2018.02); *H04L 5/0051* (2013.01); *H04L 5/1469* (2013.01); *H04W 88/02* (2013.01)

(58) Field of Classification Search
CPC ... H04L 5/0053; H04L 5/0091; H04L 5/0051; H04L 5/1469; H04L 5/0094
See application file for complete search history.

(56) References Cited

U.S. PATENT DOCUMENTS

| | | | |
|---|---|---|---|
| 9,210,695 | B2 | 12/2015 | Kim et al. |
| 9,414,373 | B2 | 8/2016 | Park et al. |
| 2010/0255851 | A1 | 10/2010 | Kwak et al. |
| 2012/0063386 | A1 | 3/2012 | Park et al. |
| 2012/0157140 | A1 | 6/2012 | Kim et al. |
| 2012/0236816 | A1 | 9/2012 | Park et al. |
| 2013/0039254 | A1 | 2/2013 | Kim et al. |
| 2013/0178220 | A1 | 7/2013 | Lee et al. |
| 2013/0286960 | A1 | 10/2013 | Li et al. |
| 2013/0287064 | A1 | 10/2013 | Seo et al. |
| 2013/0301597 | A1 | 11/2013 | Kim et al. |
| 2014/0293881 | A1 | 10/2014 | Khoshnevis et al. |
| 2015/0049824 | A1 | 2/2015 | Kim et al. |
| 2015/0110038 | A1 | 4/2015 | Yang et al. |
| 2015/0181577 | A1 | 6/2015 | Moulsley |
| 2015/0195069 | A1 | 7/2015 | Yi et al. |
| 2015/0208366 | A1 | 7/2015 | Papasakellariou et al. |
| 2015/0215906 | A1 | 7/2015 | Park et al. |
| 2016/0087706 | A1 | 3/2016 | Guey et al. |
| 2016/0330011 | A1 | 11/2016 | Lee et al. |
| 2017/0019915 | A1 | 1/2017 | Nogami et al. |
| 2017/0099694 | A1 | 4/2017 | Qian et al. |
| 2017/0208568 | A1* | 7/2017 | Nam ..................... H04W 72/23 |
| 2017/0238311 | A1 | 8/2017 | Hooli et al. |
| 2017/0257860 | A1 | 9/2017 | Nam et al. |
| 2017/0272221 | A1* | 9/2017 | Yi ......................... H04W 16/14 |
| 2017/0289818 | A1* | 10/2017 | Ng ........................ H04L 5/0053 |
| 2017/0289966 | A1 | 10/2017 | Islam et al. |
| 2017/0367084 | A1 | 12/2017 | Cheng et al. |
| 2018/0020446 | A1 | 1/2018 | Han et al. |
| 2018/0041995 | A1 | 2/2018 | Fukui et al. |
| 2018/0191547 | A1* | 7/2018 | Mukherjee ........ H04W 72/0446 |
| 2018/0234224 | A1* | 8/2018 | Faronius ............... H04W 72/54 |
| 2018/0279233 | A1* | 9/2018 | Wang ................... H04W 52/06 |
| 2018/0295220 | A1 | 10/2018 | Ren et al. |
| 2018/0295649 | A1 | 10/2018 | Bhorkar et al. |
| 2018/0310283 | A1* | 10/2018 | Deenoo ................. H04L 5/0053 |
| 2019/0029046 | A1 | 1/2019 | Li et al. |
| 2019/0124673 | A1 | 4/2019 | Seo et al. |
| 2019/0230647 | A1 | 7/2019 | Yang et al. |
| 2020/0305098 | A1* | 9/2020 | Kim ................... H04W 72/0446 |
| 2020/0305177 | A1 | 9/2020 | Yasukawa et al. |
| 2020/0395987 | A1 | 12/2020 | Chang et al. |

FOREIGN PATENT DOCUMENTS

| | | |
|---|---|---|
| CN | 102438312 A | 5/2012 |
| CN | 104160637 A | 11/2014 |
| CN | 104620551 A | 5/2015 |
| CN | 104704754 A | 6/2015 |
| CN | 104704766 A | 6/2015 |
| CN | 104871469 A | 8/2015 |
| EP | 2905915 A1 | 8/2015 |
| WO | 2014110759 A1 | 7/2014 |
| WO | 2016046607 A1 | 3/2016 |

OTHER PUBLICATIONS

CN-201610038891.9, Certified Foreign Priority document, Jan. 20, 2016 (Year: 2016).

European Search Report—EP21182110—Search Authority—The Hague—Sep. 14, 2021.

Intel Corporation: "On the Support of Cross-Burst Scheduling", 3GPP TSG RAN WG1 Meeting #84bis, R1-162353, Apr. 2, 2016, XP051080132, Retrieved from the Internet: URL:http://www.3gpp.org/ftp/tsg_ran/WG1_RL1/TSGR1_84b/Docs/ [retrieved on Apr. 2, 2016], 4 pages, Chapters 2.1 and 2.2.

International Preliminary Report on Patentability—PCT/US2017/022803, The International Bureau of WIPO—Geneva, Switzerland, Oct. 18, 2018.

International Search Report and Written Opinion—PCT/US2017/022803—ISA/EPO—Jun. 21, 2017.

Jun, L.X., et al., "MIMO-OFDM Frame Resource Allocation Algorithm Based on Effective Bandwidth Theory", Microelectronics and Computer, vol. 24, No. 12, Dec. 24, 2007, pp. 153-156.

Levanen T.A., et al., "Radio Interface Evolution Towards 5G and Enhanced Local Area Communications", IEEE Access, vol. 2, Sep. 17, 2014 (Sep. 17, 2014), pp. 1005-1029, XP011559830, DOI: 10.1109/ACCESS.2014.2355415, https://ieeexplore.ieee.org/stamp/stamp.jsp?tp=&arnumber=6891105, Section V; figures 2,4, tables 8,12, Section VI.A; figure 5., figure 2, table 12.

Nokia Networks et al., "On LAA PUSCH Scheduling and UL Grant Enhancements", 3GPP TSG RAN WG1 Meeting #84, R1-160788, Feb. 14, 2016, XP051054115, Retrieved from the Internet: URL:http://www.3gpp.org/ftp/Meetings_3GPP_SYNC/RAN1/Docs/ [retrieved on Feb. 14, 2016], 6 pages.

NTT Docomo, et al., "Discussion on PUSCH Design for eLAA UL", 3GPP TSG RAN WG1 Meeting #84, R1-160946, Feb. 14, 2016, XP051054254, Retrieved from the Internet: URL:http://www.3gpp.org/ftp/Meetings_3GPP_SYNC/RAN1/Docs/ [retrieved on Feb. 14, 2016], pp. 1-5.

Research in Motion, et al., "PDCCH Enhancement Considerations," 3GPP Draft, 3GPP TSG RAN WG1 Meeting #65, R1-111661(RIM—PDCCH Enhancement Consideration), 3rd Generation Partnership Project (3GPP), Mobile Competence Centre, 650, Route Des Lucioles, F-06921, Sophia-Antipolis Cedex, France, vol. RAN WG1, No. Barcelona, Spain, May 9, 2011-May 13, 2011, May 3, 2011 (May 3, 2011), XP050491288, 4 pages, [retrieved on May 3, 2011], section 2.2.

Samsung: "Partial Subframe for LAA," 3GPP TSG RAN WG1 #82, R1-154150, Beijing, China, Aug. 24-28, 2015, (Aug. 15, 2015), 6 pages.

Sharp: "Subframe Structure for LAA Discontinuous Transmission", 3GPP TSG RAN WG1 Meeting #82bis, R1-155569, Oct. 5-9, 2015, XP051039695, Retrieved from the Internet: URL:http://www.3gpp.org/ftp/Meetings_3GPP_SYNC/RAN1/Docs/, 5 pages, Chapter 4.

Taiwan Search Report—TW106108878—TIPO—Nov. 1, 2020.

\* cited by examiner

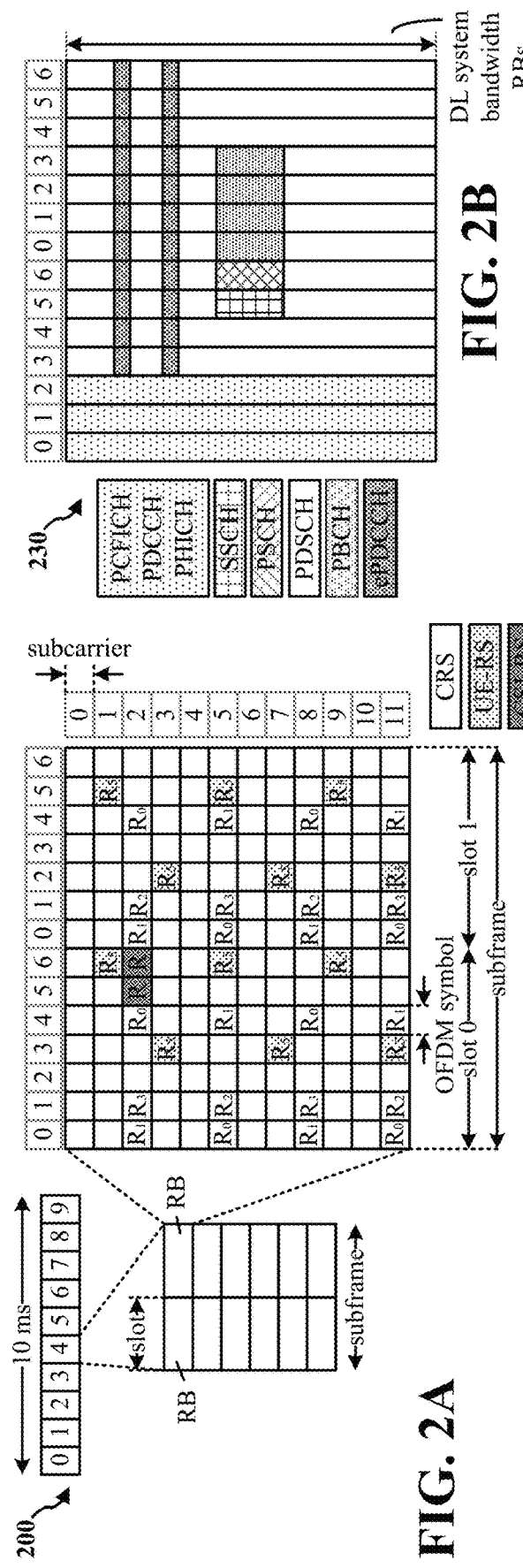
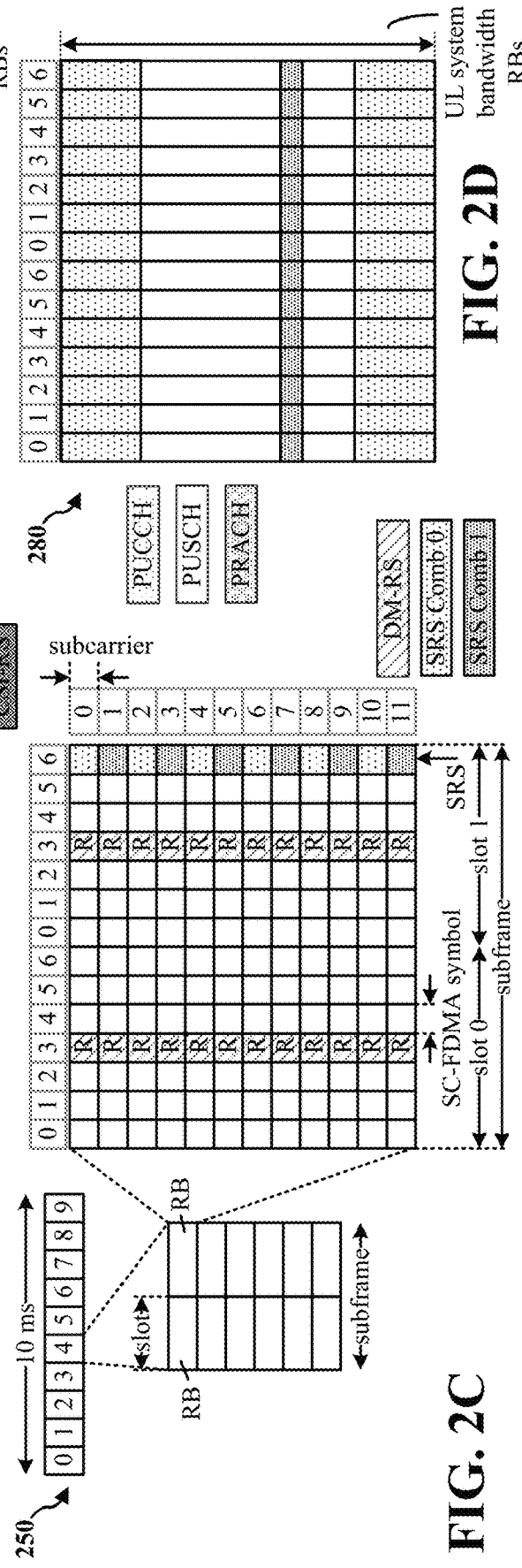
FIG. 2A  FIG. 2B  FIG. 2C  FIG. 2D

Frame Structure (PDSCH / PUSCH)

| configurations | SYMBOL INDEX | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | Dc | Dd | Dd | Dd | Dd | Dd | Dd | Dd | Dd | Dd | Dd | Dd | Dd / CSI-RS | Dd / CSI-RS |
| 1 | Dc | Dd | Dd | Dd | Dd | Dd | Dd | Dd | Dd | Dd | Dd | Dd | GP | Uc / SRS |
| 2 | Dc | Dc | Dd | Dd | Dd | Dd | Dd | Dd | Dd | Dd | Dd | Dd | Dd / CSI-RS | Dd / CSI-RS |
| 3 | Dc | Dc | Dd | Ud | Ud | Ud | Ud | Ud | Ud | Ud | Ud | Ud | GP | Uc / SRS |
| 4 | Dc | GP | Ud | Ud | Ud | Ud | Ud | Ud | Ud | Ud | Ud | Ud | Ud | Ud |
| 5 | Dc | GP | Ud | Ud | Ud | Ud | Ud | Ud | Ud | Ud | Ud | Ud | Ud | Uc / SRS |
| 6 | Dc | GP | Gp | Ud | Ud | Ud | Ud | Ud | Ud | Ud | Ud | Ud | Ud | CSI-RS |
| 7 | Dc | Dc | Gp | Ud | Ud | Ud | Ud | Ud | Ud | Ud | Ud | Ud | SRS | CSI-RS |
| 8 | Dc | Dc | | | | | | | | | | | SRS | Uc |
| ... | | | | | | | | | | | | | | |

Dc — Downlink control (PDCCH)
Uc — Uplink control (PDCCH)
Dd — Downlink data (PDSCH)
Ud — Uplink data (PUSCH or PUSCH + UCI)
GP — Gap

FIG. 5

INDICATING START AND STOP SYMBOLS OF PDSCH AND PUSCH THROUGH PDCCH

CROSS-REFERENCE TO RELATED APPLICATION(S)

This application is a continuation of U.S. application Ser. No. 15/365,893, entitled "INDICATING START AND STOP SYMBOLS OF PDSCH AND PUSCH THROUGH PDCCH," filed on Nov. 30, 2016, which claims the benefit of U.S. Provisional Application Ser. No. 62/318,707, entitled "INDICATING START AND STOP SYMBOLS OF PDSCH AND PUSCH THROUGH PDCCH," filed on Apr. 5, 2016, all of which are expressly incorporated by reference herein in their entirety.

BACKGROUND

Field

The present disclosure relates generally to communication systems, and more particularly, to indicating or specifying start and stop symbols of a physical downlink shared channel and/or a physical uplink shared channel through a physical downlink control channel in millimeter wave (mmW) wireless access networks.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

One way to meet the increasing demand for mobile broadband is to utilize the millimeter wavelength spectrum. In millimeter wave communications, downlink and uplink resource grants may be dynamically and directionally scheduled by a base station through the physical downlink control channel. As such, a need exists to enable a base station to provide an indication of the resource grants.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In millimeter wave communications, downlink and uplink resource grants may be dynamically and directionally scheduled by a base station through the physical downlink control channel. In an aspect, the base station may indicate the resource grants via control symbols in a physical downlink control channel and in a physical uplink control channel in the sub-frame in which a user equipment receives the resource. The base station may specify both the starting symbol and the stopping symbol of the physical downlink shared channel and/or the physical uplink shared channel through the physical downlink control channel. Information related to the start and stop symbols may be indicated by several bits in downlink control information transmitted by the base station.

In an aspect of the disclosure, a method, a computer-readable medium, and an apparatus are provided. The apparatus may be a base station (e.g., a mmW base station). The apparatus may determine a first symbol index and a second symbol index associated with downlink resources allocated to a user equipment. The first symbol index may indicate when the downlink resources begin in a subframe, and the second symbol index may indicate when the downlink resources end in the subframe. The apparatus may transmit the first symbol index and the second symbol index to the user equipment.

In another aspect, an apparatus is provided. The apparatus may include means for determining a first symbol index and a second symbol index associated with downlink resources allocated to a user equipment. The first symbol index may indicate when the downlink resources begin in a subframe, and the second symbol index may indicate when the downlink resources end in the subframe. The apparatus may include means for transmitting the first symbol index and the second symbol index to the user equipment.

In another aspect, a computer-readable medium storing computer executable code is provided. The computer-readable medium may include code to determine a first symbol index and a second symbol index associated with downlink resources allocated to a user equipment. The first symbol index may indicate when the downlink resources begin in a subframe, and the second symbol index may indicate when the downlink resources end in the subframe. The computer-readable medium may include code transmit the first symbol index and the second symbol index to the user equipment.

In another aspect of the disclosure, a method, a computer-readable medium, and an apparatus are provided. The apparatus may be a base station (e.g., a mmW base station). The apparatus may determine a first symbol index and a second symbol index associated with uplink resources allocated to a user equipment. The first symbol index may indicate when the uplink resources begin in a subframe and the second symbol index may indicate when the uplink resources end in the subframe. The apparatus may transmit an indication of the first symbol index and the second symbol index to the user equipment.

In another aspect, an apparatus is provided. The apparatus may include means for determining a first symbol index and a second symbol index associated with uplink resources allocated to a user equipment. The first symbol index may indicate when the uplink resources begin in a subframe and the second symbol index may indicate when the uplink resources end in the subframe. The apparatus include means for transmitting an indication of the first symbol index and the second symbol index to the user equipment.

In another aspect, a computer-readable medium storing computer executable code is provided. The computer-readable medium may include code to determine a first symbol index and a second symbol index associated with uplink resources allocated to a user equipment. The first symbol index may indicate when the uplink resources begin in a subframe and the second symbol index may indicate when the uplink resources end in the subframe. The computer-readable medium may include code to transmit an indication of the first symbol index and the second symbol index to the user equipment.

In another aspect of the disclosure, a method, a computer-readable medium, and an apparatus are provided. The apparatus may be a user equipment. The apparatus may receive a first symbol index and a second symbol index associated with downlink resources allocated by a base station. The first symbol index may indicate when the downlink resources begin in a subframe, and the second symbol index may indicate when the downlink resources end in the subframe. The apparatus may receive data from the base station based on the received first symbol index and the received second symbol index.

In another aspect, an apparatus is provided. The apparatus may include means for receiving a first symbol index and a second symbol index associated with downlink resources allocated by a base station. The first symbol index may indicate when the downlink resources begin in a subframe, and the second symbol index may indicate when the downlink resources end in the subframe. The apparatus may include means for receiving data from the base station based on the received first symbol index and the received second symbol index.

In another aspect, a computer-readable medium storing computer executable code is provided. The computer-readable medium may include code to receive a first symbol index and a second symbol index associated with downlink resources allocated by a base station. The first symbol index may indicate when the downlink resources begin in a subframe, and the second symbol index may indicate when the downlink resources end in the subframe. The computer-readable medium may include code to receive data from the base station based on the received first symbol index and the received second symbol index.

In another aspect of the disclosure, a method, a computer-readable medium, and an apparatus are provided. The apparatus may be a user equipment. The apparatus may receive an indication of a first symbol index and a second symbol index associated with uplink resources allocated by a base station. The first symbol index may indicate when the uplink resources begin in a subframe and the second symbol index may indicate when the uplink resources end in the subframe. The apparatus may transmit data to the base station based on the first symbol index and the second symbol index.

In another aspect, an apparatus is provided. The apparatus may include means for receiving an indication of a first symbol index and a second symbol index associated with uplink resources allocated by a base station. The first symbol index may indicate when the uplink resources begin in a subframe and the second symbol index may indicate when the uplink resources end in the subframe. The apparatus may include means for transmitting data to the base station based on the first symbol index and the second symbol index.

In another aspect, a computer-readable medium storing computer executable code is provided. The computer-readable medium may include code to receive an indication of a first symbol index and a second symbol index associated with uplink resources allocated by a base station. The first symbol index may indicate when the uplink resources begin in a subframe and the second symbol index may indicate when the uplink resources end in the subframe. The computer-readable medium may include code to transmit data to the base station based on the first symbol index and the second symbol index.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

FIG. 5 is a diagram illustrating frame structures for PDSCH and PUSCH.

DETAILED DESCRIPTION

Figure 1:
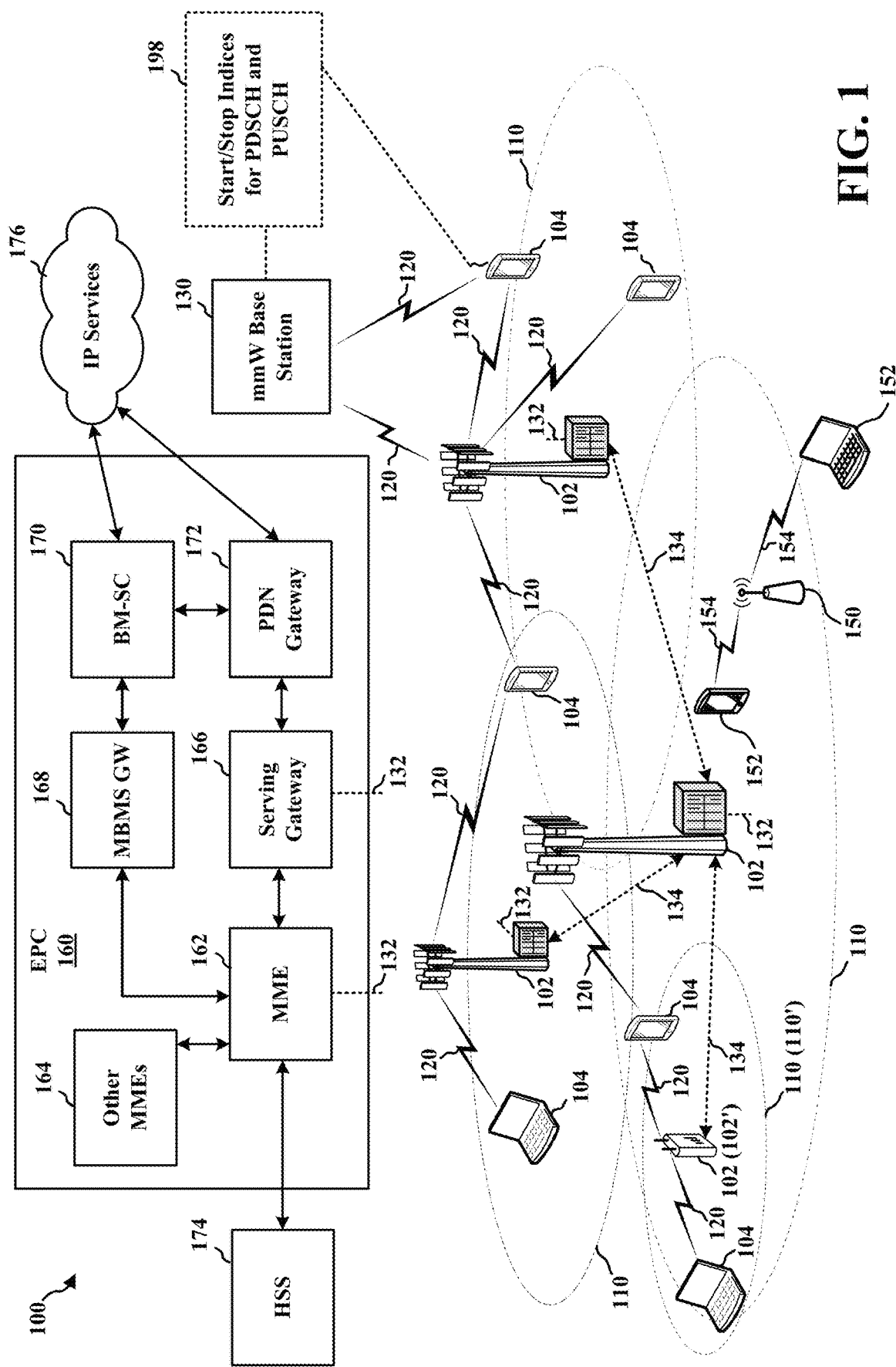
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNB s. The small cells include femtocells, picocells, and microcells. The access network 100 further includes a mmW network that includes a mmW base station 130 and the one or more UEs 104.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102 and/or the mmW base station 130 may be configured to transmit start and stop symbol indices 198 for the PDSCH and the PUSCH to the UE 104.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. In LTE, for example, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for example, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DMRS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
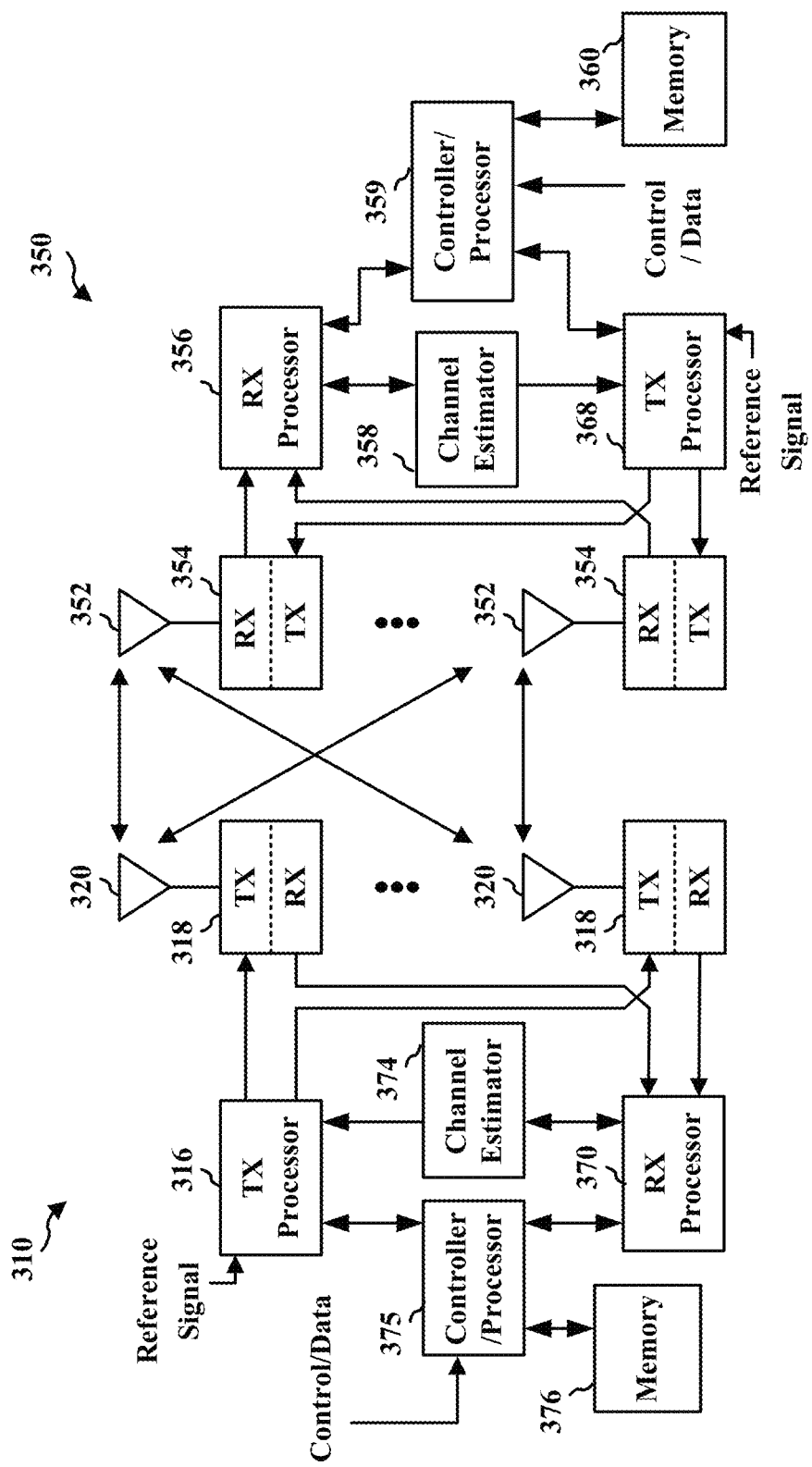
FIG. 3 is a diagram illustrating an example of a base station and user equipment (UE) in an access network.

FIG. 3 is a block diagram of a base station 310 in communication with a UE 350 in an access network. The base station 310 may be an eNB or a mmW base station. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
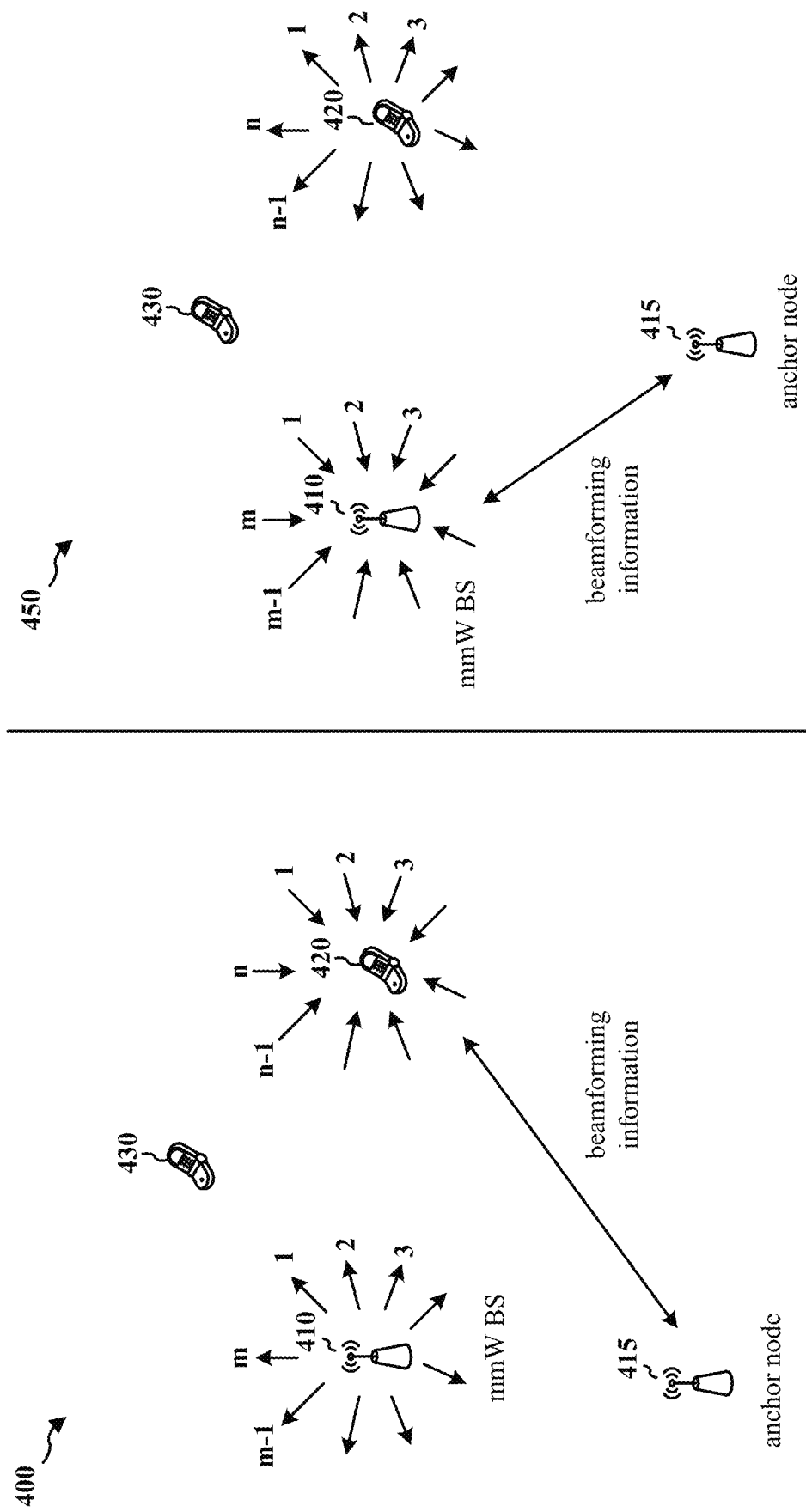
FIG. 4 illustrates diagrams of a mmW network.

FIG. 4 illustrates diagrams 400, 450 of a mmW network. In the diagram 400, for example, the mmW network includes a mmW base station 410 and a number of UEs 420, 430. The base station 410 may include hardware for performing analog and/or digital beamforming. If the base station 410 is equipped with analog beamforming, at any one time, the base station 410 may transmit or receive a signal in only one direction. If the base station 410 is equipped with digital beamforming, the base station 410 may concurrently transmit multiple signals in multiple directions or may receive multiple signals concurrently in multiple directions. Further, the UE 420, for example, may include hardware for performing analog and/or digital beamforming. If the UE 420 is equipped with analog beamforming, at any one time, the UE 420 may transmit or receive a signal in only one direction. If the UE 420 is equipped with digital beamforming, the UE 420 may concurrently transmit multiple signals in multiple directions or may concurrently receive multiple signals in multiple directions.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters (the super high frequency (SHF) band extends between 3 GHz and 30 GHz, also referred to as centimeter wave). While the disclosure herein refers to mmWs, it should be understood that the disclosure also applies to near mmWs. Further, while the disclosure herein refers to mmW base stations, it should be understood that the disclosure also applies to near mmW base stations.

In order to build a useful communication network in the millimeter wavelength spectrum, a beamforming technique may be used to compensate for path loss. Beamforming technique focuses the RF energy into a narrow direction to allow the RF beam to propagate farther in that direction. Using the beamforming technique, non-line of sight (NLOS) RF communication in the millimeter wavelength spectrum may rely on reflection and/or diffraction of the beams to reach the UE. If the direction becomes blocked, either because of UE movement or changes in the environment (e.g., obstacles, humidity, rain, etc.), the beam may not be able to reach the UE. Thus, in order to ensure that the UE has continuous, seamless coverage, multiple beams in as many different direction as possible may be available. In an aspect, the beamforming technique may require that the mmW base stations and the UEs transmit and receive in a direction that allows the most RF energy to be collected.

In the mmW network, UEs may perform beam sweeps with mmW base stations within range. The beam sweeps may be performed as illustrated in the diagram 400 and/or diagram 450. Referring to the diagram 400, in a beam sweep, the mmW base station 410 may transmit m beams in a plurality of different spatial directions. The UE 420 listens/scans for the beam transmissions from the mmW base station 410 in n different receive spatial directions. When listening/scanning for the beam transmissions, the UE 420 may listen/scan for the beam sweep transmission from the mmW base station 410 m times in each of the n different receive spatial directions (a total of m*n scans). In another configuration, referring to the diagram 450, in a beam sweep, the UE 420 may transmit n beams in a plurality of different spatial directions. The mmW base station 410 listens/scans for the beam transmissions from the UE 420 in m different receive spatial directions. When listening/scanning for the beam transmissions, the mmW base station 410 may listen/scan for the beam sweep transmission from the UE 420 n times in each of the m different receive spatial directions (a total of m*n scans).

Based on the performed beam sweeps, the UEs and/or the mmW base stations determine a channel quality associated with the performed beam sweeps. For example, if the beam sweep process in diagram 400 is performed, the UE 420 may determine the channel quality associated with the performed beam sweeps. However, if the beam sweep process in the diagram 450 is performed, the mmW base station 410 may determine the channel quality associated with the performed beam sweeps. If the UE 420 determines a channel quality associated with the performed beam sweeps, the UE 420 sends the channel quality information (also referred to as beam sweep result information) to the mmW base station 410 or an anchor node 415. The anchor node 415 may be another mmW base station, an eNB, or another type of base station. The UE 420 may send the beam sweep result information directly to the anchor node 415 if the anchor node 415 is in range, or may send the beam sweep result information to a serving mmW base station (e.g., the mmW base station 410), which forwards the beam sweep result information to the anchor node 415. If the mmW base station 410 determines a channel quality associated with the performed beam sweeps, the mmW base station 410 sends the beam sweep result information to the UE 420 or the anchor node 415. In an aspect, the channel quality may be affected by a variety of factors. The factors include movement of the UE 420 along a path or due to rotation (e.g., a user holding and rotating the UE 420), movement along a path behind obstacles or within particular environmental conditions (e.g., obstacles, rain, humidity). The UE 420, the mmW base station 410, and the anchor node 415 may also exchange other information, such as configuration information, for beamforming (e.g., analog or digital beamforming capabilities, beamforming type, timing information, etc.) Based on the received information, the anchor node 415 may provide beamforming configuration information to the mmW base station 410 and/or the UE 420 (e.g., mmW network access configuration information, information for adjusting beam sweeping periodicity, information regarding overlapping coverage for predicting a handoff to another base station, such as a mmW base station).

In LTE, PUCCH may be transmitted in the outer edge (outer frequencies) of all symbols within a subframe. As discussed in FIG. 4, however, mmW technology is more directional. To mitigate pathloss, a base station (e.g., a mmW base station) may have to beamform for transmissions. When beamforming, it may be difficult for the base station to enable frequency division multiplexing for multiple UEs within one symbol. That is, it may be difficult, for example, to receive PUCCH and PUSCH in the same symbol. As workaround, PUCCH and PUSCH or PDCCH and PDSCH may be transmitted on separate symbols. The base station may then signal the UE to inform the UE which symbols contain PDSCH or PUSCH, for example.

In some LTE standards, the PUSCH and the PDSCH may extend to the last symbol within a subframe. In these circumstances, it may not be necessary to signal the stop symbol for PUSCH or PDSCH because a UE may assume that the stop symbol is the last symbol within the subframe. However, in future standards, subframes may be shared. For example, two or more UEs may be time-division multiplexed within a subframe. As such, the assumption that the stop symbol for PUSCH or PDSCH is the last symbol may no longer be valid. Because UEs may share a subframe, one UE may be allocated PDSCH on symbol indices 1 to 3 and another UE may be allocated PDSCH on symbol indices 4 through 6, for example.

FIG. 5 is a diagram 500 illustrating frame structures for PDSCH and PUSCH. Configurations 0-3 are options for a PDSCH frame structure. A base station (e.g., the mmW base station 410) may utilize one of the configurations 0-3 for downlink transmissions to a UE (e.g., the UE 420). Configurations 4-8 are options for a PUSCH frame structure. The UE may utilize one of the configurations 4-8 for uplink transmissions to the base station. Other frame structures may also be used. The base station and/or the UE may be preconfigured with the frame structures depicted in FIG. 5 for purposes of enabling mmW transmissions.

Referring to FIG. 5, in configuration 0, symbol index 0 may be reserved for downlink control information (e.g., in the PDCCH). The downlink control information may indicate the downlink resources allocated to the UE for downlink transmissions. The downlink control information may indicate that symbol indices 1-11 may be available for transmitting downlink data, and that symbol indices 12 and 13 may be available for transmitting either downlink data or CSI-RS. In configuration 1, symbol index 0 may be reserved for downlink control information. The downlink control information may indicate that symbol indices 1-11 may be available for transmitting downlink data, and that symbol index 13 may be available for transmitting either uplink control information (UCI) or SRSs. A gap (e.g., no data) is reserved for symbol index 12 to provide a delay for switching between downlink and uplink transmissions. In configuration 2, symbol indices 0 and 1 may be reserved for downlink control information. The downlink control information may indicate that symbol indices 2-11 may be available for transmitting downlink data. Symbol indices 12 and 13 may be available for transmitting either downlink data or CSI-RS. In configuration 3, symbol indices 0 and 1 may be reserved for downlink control information. The downlink control information may indicate that symbol indices 2-11 may be available for transmitting downlink data. Symbol index 13 may be available for transmitting either UCI or SRSs. A gap (e.g., no data) is reserved for symbol index 12 to provide a delay for switching between downlink and uplink transmissions. For instance, a UE may require time to transition between downlink and uplink transmissions and vice versa.

Referring to FIG. 5, in configuration 4, symbol index 0 may be reserved for downlink control information (e.g., in the PDCCH). The downlink control information may indicate uplink resources allocated to the UE for uplink transmissions. The downlink control information may indicate that symbol indices 2-13 may be available for transmitting uplink data. The symbol index 1 may be reserved for a gap. In configuration 5, symbol index 0 may be reserved for downlink control information. The downlink control information may indicate that symbol indices 2-12 are available for transmitting uplink data and that symbol 13 may be used for transmitting either uplink control information (e.g., PUCCH) or SRSs. The symbol index 1 may be reserved for a gap. In configuration 6, symbol index 0 may be reserved for downlink control information. The downlink control information may indicate that symbol indices 2-12 are available for transmitting uplink data and that symbol 13 may be used for transmitting CSI-RS. The symbol index 1 may be reserved for a gap. In configuration 7, symbol indices 0 and 1 may be reserved for downlink control information. The downlink control information may indicate that symbol indices 3-11 are available for transmitting uplink data and that symbol 12 may be used for transmitting SRS and symbol 13 may be used for transmitting CSI-RS. The symbol index 2 may be reserved for a gap. In configuration 8, symbol indices 0 and 1 may be reserved for downlink control information. The downlink control information may indicate that symbol indices 3-11 are available for transmitting uplink data and that symbol 12 may be used for transmitting SRS and symbol 13 may be used for transmitting uplink control information. The symbol index 2 may be reserved for a gap.

Referring to FIG. 5, for PDSCH frames, the PDCCH may indicate downlink resources available on the same subframe in which the PDCCH was transmitted or in any following subframe. Similarly, for PUSCH frames, the PDCCH may indicate uplink resources available on the same subframe in which the PDCCH was transmitted or in any following subframe. The PDCCH may also indicate a symbol index on which a reference signal (e.g., a demodulation reference signal (DMRS)) is to be transmitted by a base station or a UE. In an aspect, when the number of symbols in the subframe is 14, the start symbol index may range from 0 to 3 and the stop symbol index may range from 10 to 13.

If multiple UEs are time-division multiplexed within a subframe, the downlink control information may include start and stop symbol sets for downlink resources and uplink resources. Each start and stop symbol set may include start and stop symbol indices corresponding to a UE.

Figure 6:
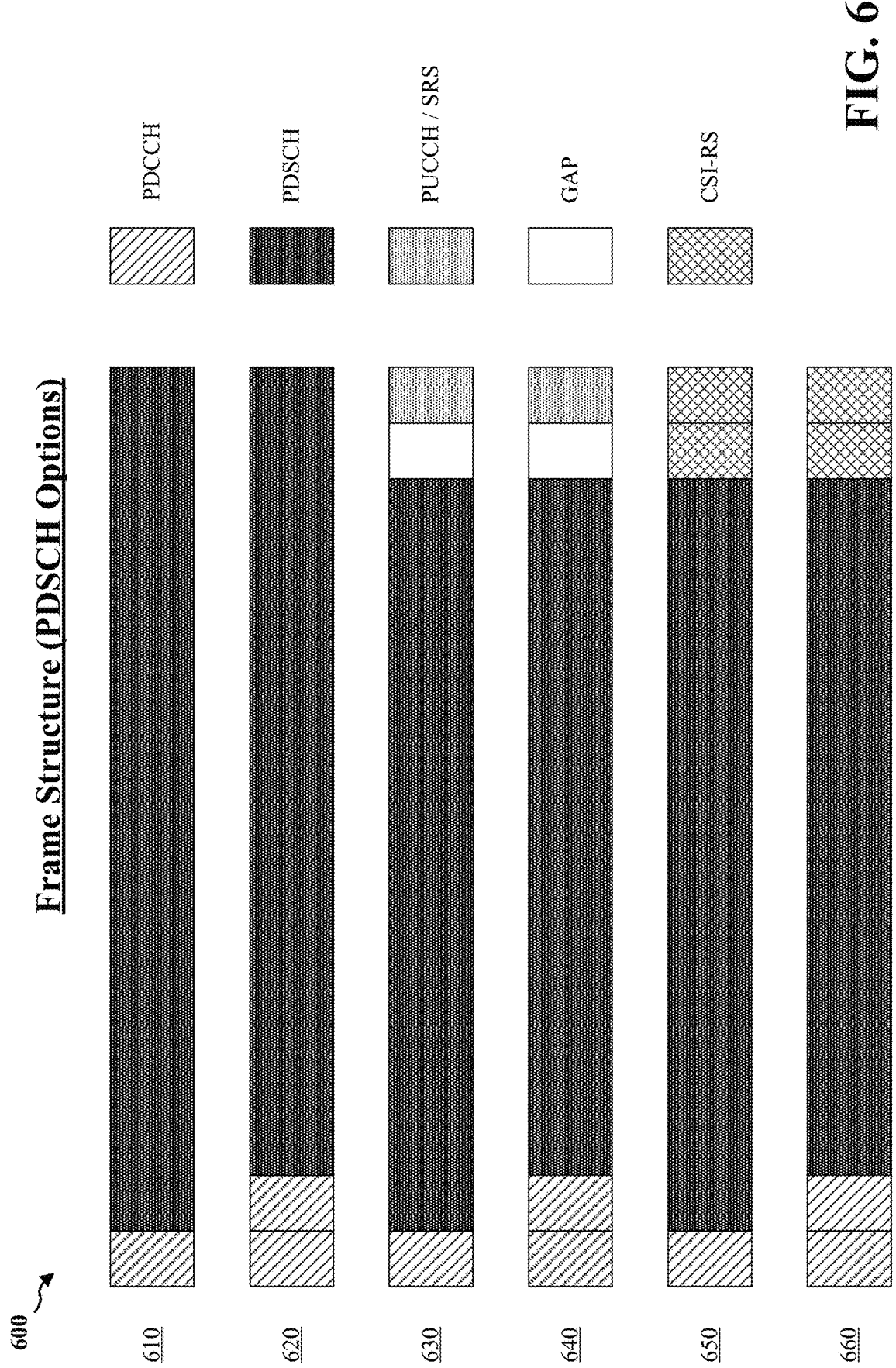
FIG. 6 is a diagram of frame structures for PDSCH.

FIG. 6 is a diagram 600 of frame structures for PDSCH. In option 610, the PDSCH frame structure may include PDCCH at symbol 0 and PDSCH in the remaining symbols. At option 620, the PDSCH frame structure may include PDCCH at symbols 0 and 1 and PDSCH in the remaining symbols. At option 630, the PDSCH frame structure may include PDCCH at symbol 0, a gap in symbol 12, PUCCH or SRS in symbol 13, and PDSCH in the remaining symbols in between the PDCCH and the gap. At option 640, the PDSCH frame structure may include PDCCH at symbols 0 and 1, a gap in symbol 12, PUCCH or SRS in symbol 13, and PDSCH in the remaining symbols in between the PDCCH and the gap. At option 650, the PDSCH frame structure may include PDCCH at symbol 0, CSI-RS at symbols 12 and 13, and PDSCH in the remaining symbols between PDCCH and CSI-RS. At option 660, the PDSCH frame structure may include PDCCH at symbols 0 and 1, CSI-RS at symbols 12 and 13, and PDSCH in the remaining symbols between PDCCH and CSI-RS. Other configurations for the PDSCH frame structure may also be utilized.

Figure 7:
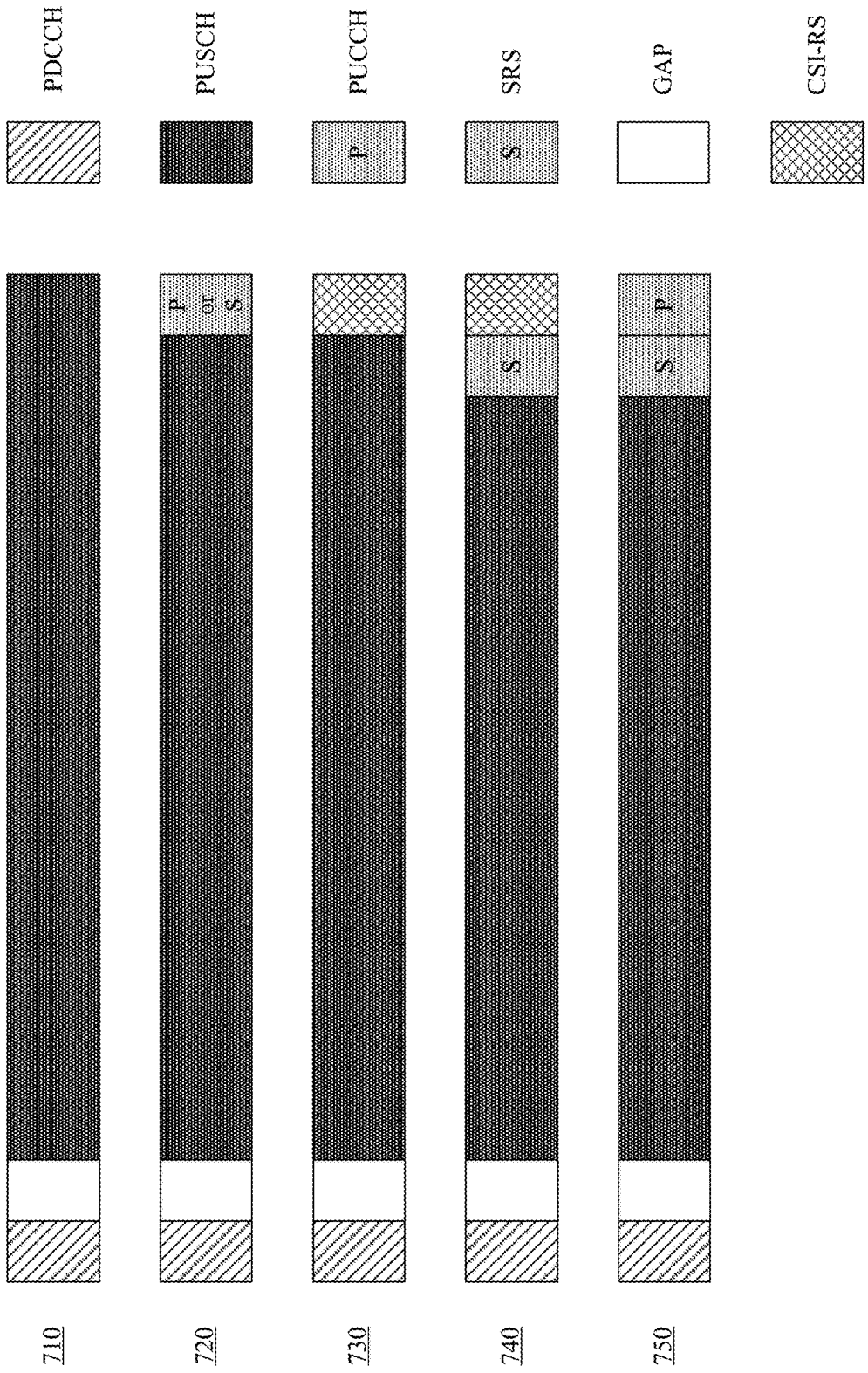
FIG. 7 is a diagram of frame structures for PUSCH.

FIG. 7 is a diagram 700 of frame structures for PUSCH. In option 710, the PUSCH frame structure may include PDCCH at symbol 0, a gap at symbol 1, and PUSCH in the remaining symbols after the gap. In option 720, the PUSCH frame structure may include PDCCH at symbol 0, a gap at symbol 1, PUCCH or SRS at symbol 13, and PUSCH in the remaining symbols between the gap and the PUCCH/SRS. In option 730, the PUSCH frame structure may include PDCCH at symbol 0, a gap at symbol 1, CSI-RS at symbol 13, and PUSCH in the remaining symbols between the gap and the CSI-RS. In option 740, the PUSCH frame structure may include PDCCH at symbol 0, a gap at symbol 1, SRS at symbol 12, CSI-RS at symbol 13, and PUSCH in the remaining symbols between the gap and the SRS. In option 750, the PUSCH frame structure may include PDCCH at symbol 0, a gap at symbol 1, SRS at symbol 12, PUCCH at symbol 13, and PUSCH in the remaining symbols between the gap and the SRS. Other configurations for the PUSCH frame structure may also be utilized.

Figure 8:
FIG. 8 is a diagram of an exemplary method for indicating start and stop symbol indices of downlink and uplink resources via a control channel.

FIG. 8 is a diagram 800 of an exemplary method for indicating start and stop symbol indices of downlink and uplink resources via a control channel. Referring to FIG. 8, a base station 810 (e.g., a mmW base station) is communicating with a UE 820 in a mmW network. As previously discussed, the communications may be performed using beamforming. The base station 810 may allocate downlink resources in the PDSCH for transmitting data and/or control information to the UE 820 and/or allocate uplink resources in the PUSCH for the UE 820 to transmit data and/or control information to the base station 810. The base station 810 may determine first and second symbol indices that indicate where the downlink resources of the PDSCH are located (e.g., when in a subframe the resources begin and end) for the UE 820. For example, referring to FIG. 5, if configuration 0 is utilized, then the base station 810 may determine that PDSCH starts on symbol 1 and ends on symbol 11. The base station 810 may transmit the symbol indices 1 and 11 in a first DCI message 830 to the UE 820 via the PDCCH in symbol 0 of configuration 0. In an aspect, the symbol indices 1 and 11 may refer to the start and stop indices of the PDSCH resources in the same subframe as the PDCCH on which the indices were transmitted or on a subsequent subframe (e.g., a subframe following the one in which the indices were transmitted). In another aspect, the first DCI message 830 may have a message format that requires the start and stop symbols of the PDSCH to be within the DCI message. In another aspect, the PDCCH (and the first DCI message 830) may be transmitted in a directional manner (e.g., beamformed to the UE 820). As such, the PDCCH/first DCI message 830 may be specific to the UE 820 due to beamforming. In another aspect, the first DCI message 830 may indicate a modulation and coding scheme (MCS), a transmit power, and/or other control information associated with a downlink transmission 840. In yet another aspect, the first DCI message 830 may indicate symbol indices on which a reference signal (e.g., a DMRS) will be transmitted by the base station 810.

Upon receiving the first DCI message 830, the UE 820 may decode the first DCI message 830 based on the message format and obtain the start and stop indices of the PDSCH. Subsequently, the base station 810 may send the downlink transmission 840 to the UE 820 via the PDSCH using beamforming. The PDSCH may be dynamically (as needed when data is available) and directionally (beamformed) scheduled via the PDCCH. The UE 820 may receive the downlink transmission 840 based on the received start and stop indices of the PDSCH and decode the downlink transmission 840.

Referring to FIG. 8, the base station 810 may allocate uplink resources in the PUSCH to be used by the UE 820 for transmitting data and/or control information to the base station 810. The base station 810 may determine third and fourth symbol indices that indicate where the uplink resources of the PUSCH are located (e.g., when the uplink resources of the PUSCH begin and end in a subframe). For example, referring to FIG. 5, if configuration 4 is utilized, then the base station 810 may determine that PUSCH starts on symbol 2 and ends on symbol 13. The base station 810 may transmit the symbol indices 2 and 13 in a second DCI message 850 to the UE 820 via the PDCCH in symbol 0 of configuration 4. In an aspect, the symbol indices 2 and 13 may refer to the start and stop indices of the PUSCH resources in the same subframe as the PDCCH on which the indices were transmitted or on a subsequent subframe (e.g., a subframe following the one in which the indices were transmitted). In another aspect, the second DCI message 850 may have a message format that requires the start and stop symbols of the PUSCH to be within the DCI message. In another aspect, the PDCCH (and the second DCI message 850) may be transmitted in a directional manner (e.g., beamformed to the UE 820). As such, the PDCCH/second DCI message 850 may be specific to the UE 820 due to beamforming. In another aspect, the second DCI message 850 may indicate an MCS for the uplink data, a transmit power for the uplink data, and/or other control information associated with an uplink transmission 860. In yet another aspect, the second DCI message 850 may indicate symbol indices on which a reference signal (e.g., a DMRS) is to be transmitted by the UE 820. Subsequently, the UE 820 may send the uplink transmission 860 to the base station 810 via the PUSCH using beamforming. As such, the PUSCH may be dynamically and directionally scheduled via the PDCCH.

Although FIG. 8 only depicts a single UE, additional UEs may be present, and in another configuration, the base station 810 may time-division multiplex multiple UEs onto a single subframe, such that multiple UEs share a PDSCH and/or PUSCH. In this configuration, the first DCI message 830 and/or the second DCI message 850 may indicate a range (e.g., start/stop symbol indices) of PDSCH and/or PUSCH resources that represents a subset of the PDSCH and/or PUSCH resources within a subframe, and different UEs may be allocated different subsets of PDSCH and/or PUSCH resources within the subframe.

In an aspect, the base station 810 may have a number of ways to indicate the start and stop symbol index to the UE 820. In one aspect, the base station 810 may explicitly indicate the start and stop indices. In another aspect, as shown in FIG. 5, each frame structure configuration may include a number of downlink and/or uplink control symbols, SRS symbols, CSI-RS symbols, etc. The base station 810 may indicate or convey the start and stop symbols of the PDSCH and/or PUSCH by indicating, if any, the number of DL/UL control symbols, SRS symbols, and/or CSI-RS symbols, which implicitly indicates the remaining symbols for PDSCH or PUSCH from which the start/stop symbol indices may be derived. Referring to FIG. 5, the base station 810 may indicate that there is 1 DL control symbol, no UL control symbols, and 2 CSI-RS symbols. Based on this information, the UE 820 may infer that the configuration 0 is being used and the start and stop symbol indices are 1 and 11, respectively. In other words, the base station 810 may indicate the start and stop symbols in a DCI message, for example, by indicating a number of other symbols used for DL control, UL control, and/or reference signals.

Figure 9A:
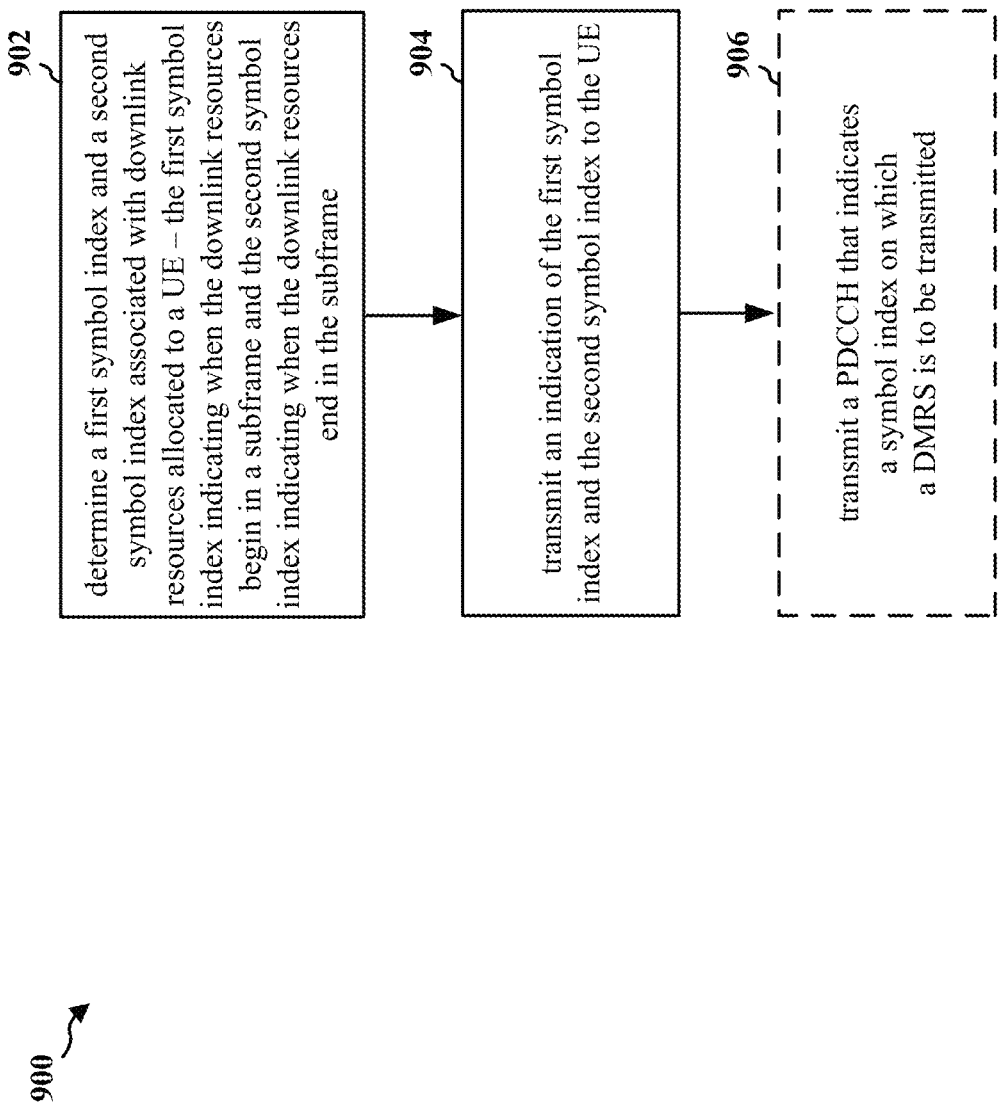
FIGS. 9A-B are flowcharts of methods of wireless communication.
Figure 9B:
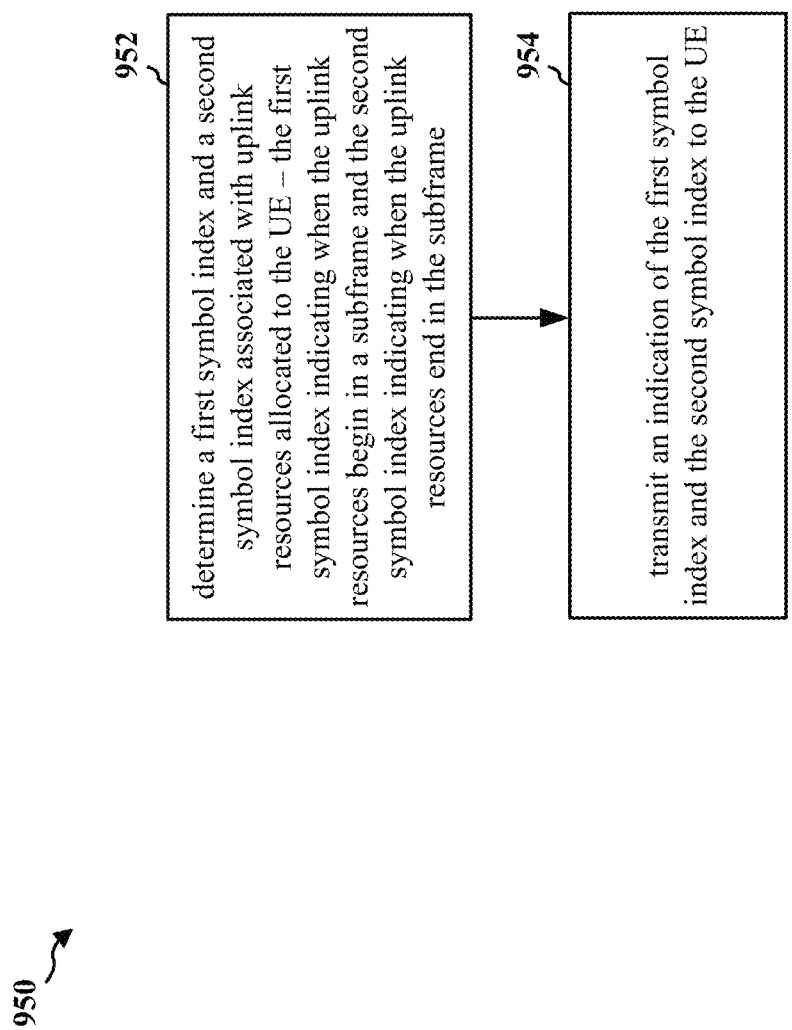

FIGS. 9A-B are flowcharts 900, 950 of methods of wireless communication. The method may be performed by a base station (e.g., the base station 810, the apparatus 1102/1102'). Referring to FIG. 9A, at 902, the base station may determine a first symbol index and a second symbol index associated with downlink resources allocated to a UE. The first symbol index may indicate when the downlink resources begin in a subframe and the second symbol index may indicate when the downlink resources end in the subframe. For example, referring to FIG. 8, the base station 810 may determine the symbol indices by identifying the PDSCH frame configuration (e.g., configuration 0). The base station 810 may allocate downlink resources to the UE 820 based on the frame configuration and identify the start and stop symbol indices associated with the allocated downlink resources in the PDSCH. In this example, the start symbol index is 1 (first symbol index) and the end symbol index is 11 (second symbol index).

At 904, the base station may transmit the first symbol index and the second symbol index to the UE. For example, referring to FIG. 8, the base station 810 may transmit the start symbol index of 1 and the stop (or end) symbol index of 11 to the UE 820. The symbol indices may be transmitted in the first DCI message 830 in the PDCCH that is specific to the UE 820 due to beamforming.

At 906, the base station may transmit a PDCCH that indicates a symbol index on which a DMRS is to be transmitted. For example, referring to FIG. 8, the base station 810 may transmit the first DCI message 830 that may contain one or more symbol indices identifying the symbol on which the base station 810 will transmit a DMRS to the UE 820.

Referring to FIG. 9B, at 952, the base station may determine a first symbol index and a second symbol index associated with uplink resources allocated to the UE. The first symbol index may indicate when the uplink resources begin in a subframe, and the second symbol index may indicate when the uplink resources end in the subframe. For example, referring to FIG. 8, the base station 810 may determine the symbol indices by identifying the PUSCH frame configuration (e.g., configuration 4). The base station 810 may allocate uplink resources to the UE 820 based on the frame configuration and identify the start and stop symbol indices associated with the allocated uplink resources in the PUSCH. In this example, the start symbol index is 2 (first symbol index) and the stop symbol index is 13 (second symbol index).

At 954, the base station may transmit an indication of the first symbol index and the second symbol index to the UE. For example, referring to FIG. 8, the base station 810 may transmit the start symbol index of 2 and the stop symbol index of 13 to the UE 820 in the second DCI message 850 in the PDCCH that is specific to the UE 820 due to beamforming. For the base station 810 may transmit other information that indicates the start and stop symbol indices.

Figure 10A:
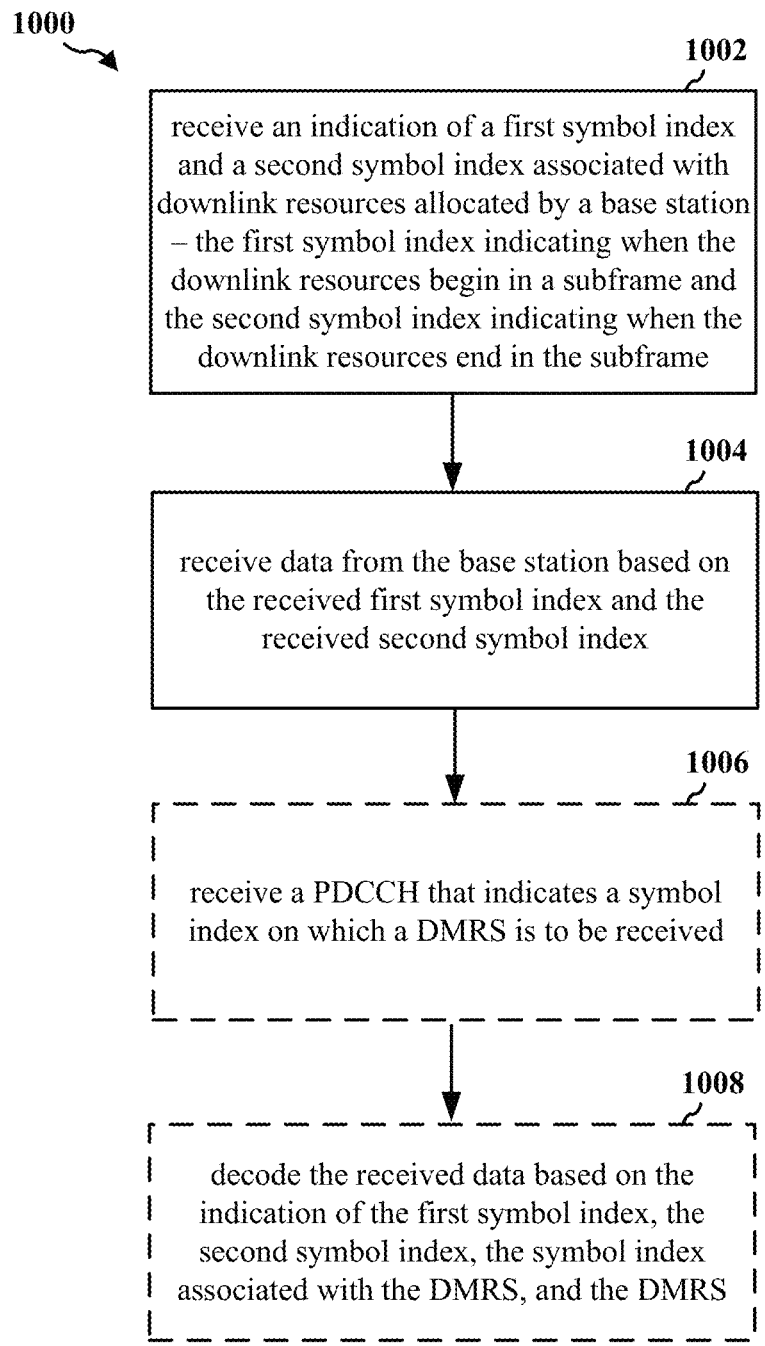
FIGS. 10A-B are flowcharts of methods of wireless communication.
Figure 10B:
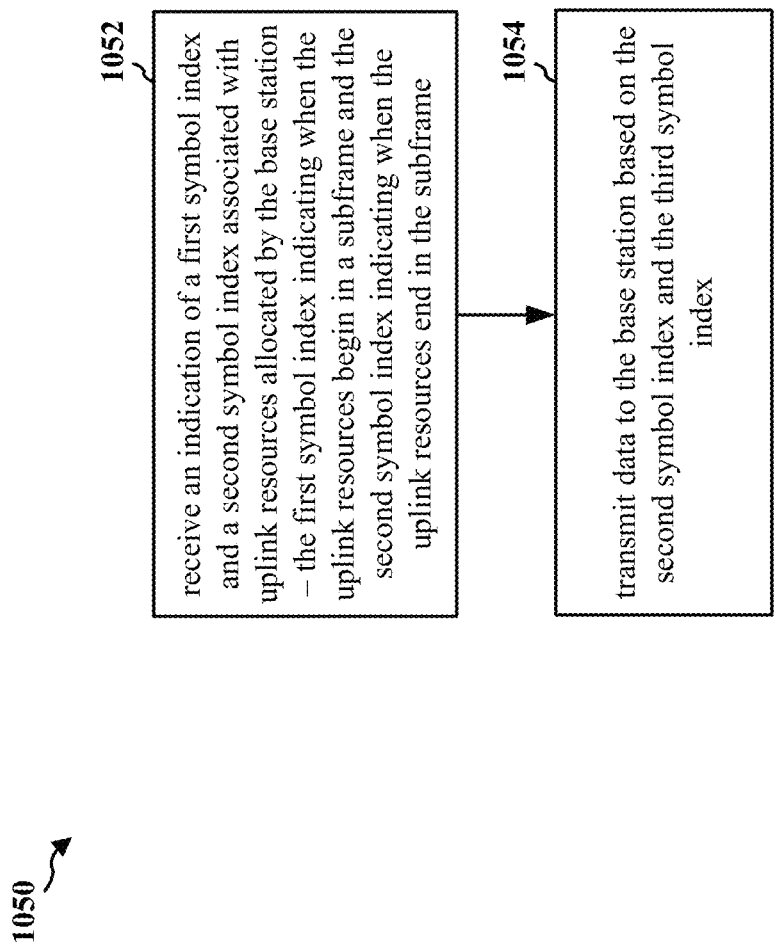

FIGS. 10A-B are flowcharts 1000, 1050 of methods of wireless communication. The method may be performed by a UE (e.g., the UE 820, the apparatus 1302/1302'). Referring to FIG. 10A, at 1002, the UE may receive an indication of a first symbol index and a second symbol index associated with downlink resources allocated by a base station. The first symbol index may indicate when the downlink resources begin in a subframe, and the second symbol index may indicate when the downlink resources end in the subframe. For example, referring to FIG. 8, the UE 820 may receive the first DCI message 830 from the base station 810. The first DCI message 830 may include start symbol index 1 (first symbol index), indicating when PDSCH resources allocated to the UE 820 begin in a subframe, and stop symbol index 11 (second symbol index), indicating when the allocated resources end.

At 1004, the UE may receive data from the base station based on the received first symbol index and the received second symbol index. For example, referring to FIG. 8, the UE 820 may receive the downlink transmission 840 from the base station 810 based on the received symbol indices 1 and 11.

At 1006, the UE may receive a PDCCH that indicates a symbol index on which a DMRS is to be received. For example, referring to FIG. 8, the UE 820 may receive the first DCI message 830 that indicates a symbol index on which the base station 810 will transmit DMRS.

At 1008, the UE may decode the received data based on the first symbol, the second symbol index, the symbol index associated with the DMRS, and the DMRS. For example, referring to FIG. 8, the UE 820 may decode the downlink transmission 840 by identifying where the downlink transmission is located using the first and second symbol indices. Subsequently, the UE 820 may perform channel estimation on the channel based on the DMRS, received based on the symbol index associated with the DMRS. The UE 820 may then decode the downlink transmission 840 based on the estimated channel.

Referring to FIG. 10B, at 1052, the UE may receive a first symbol index and a second symbol index associated with uplink resources allocated by the base station. The first symbol index may indicate when the uplink resources begin in a subframe, and the fourth symbol index may indicate when the uplink resources end in the subframe. For example, referring to FIG. 8, the UE 820 may receive a second DCI message 850 that includes a start symbol index 2 (first symbol index) and a stop symbol index 13 (second symbol index) associated with when PUSCH resources allocated to the UE 820 start and end within a subframe.

At 1008, the UE may transmit data to the base station based on the first symbol index and the second symbol index. For example, referring to FIG. 8, the UE 820 may send the uplink transmission 860 to the base station 810 using the PUSCH resources from start symbol index 2 to stop symbol index 13 within a subframe.

Figure 11:
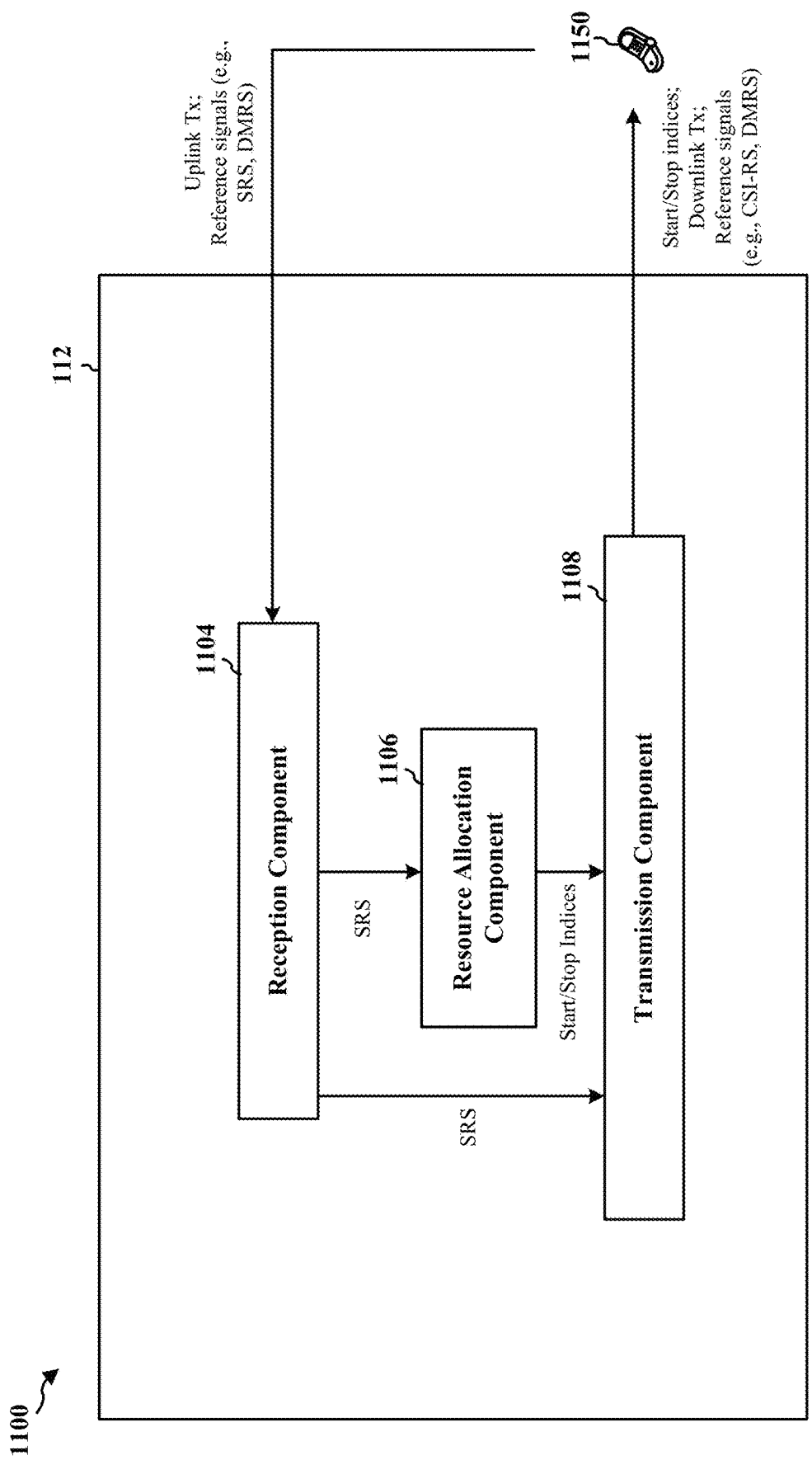
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a base station. The apparatus includes a reception component 1104, a resource allocation component 1106, and a transmission component 1108. In one configuration, the reception component 1104 may be configured to receive uplink transmissions from the UE 1150. The resource allocation component 1106 may be configured to determine a first symbol index and a second symbol index associated with downlink resources allocated to a UE 1150. The first symbol index may indicate when the downlink resources begin in a subframe, and the second symbol index may indicate when the downlink resources end in the subframe. The transmission component 1108 may be configured to transmit an indication of the first symbol index and the second symbol index to the UE 1150. In an aspect, the downlink resources may be associated with a PDSCH that is dynamically scheduled via a PDCCH. In another aspect, the PDCCH may be transmitted in a directional manner. In another aspect, the PDCCH may be UE-specific. In another aspect, the first symbol index and the second symbol index may be the respective start and stop symbol indices of the PDSCH located in a same subframe on which the PDCCH was transmitted. In another aspect, the first symbol index and the second symbol index may be the respective start and stop symbol indices of the PDSCH located in the subframe that follows a previous subframe on which the PDCCH was transmitted. In another aspect, the first symbol index and the second symbol index are transmitted via the PDCCH within a DCI message. The DCI message may be of a format that includes start and stop symbol indices for the PDSCH.

In another configuration, the resource allocation component 1106 may be configured to determine a first symbol index and a second symbol index associated with uplink resources allocated to a UE. The first symbol index may indicate when the uplink resources begin in a subframe and the second symbol index may indicate when the uplink resources end in the subframe. The transmission component 1108 may be configured to transmit an indication of the first symbol index and the second symbol index to the UE. In an aspect, the uplink resources may be associated with a PUSCH that is dynamically scheduled via a PDCCH. The PDCCH may be transmitted in a directional manner and may indicate the first symbol index and the second symbol index. In another aspect, the first symbol index and the second symbol index may be the respective start and stop symbol indices of the PUSCH located in a same subframe on which the PDCCH was transmitted. In another aspect, the first symbol index and the second symbol index may be the respective start and stop symbol indices of the PUSCH located in the subframe that follows a previous subframe on which the PDCCH was transmitted. In another aspect, the first symbol index and the second symbol index may be indicated via the PDCCH within a DCI message. The DCI message may be of a format that indicates start and stop symbol indices for the PUSCH. In another aspect, the indication of the first symbol index and the second symbol index may be transmitted via RRC signaling.

In an aspect, the first symbol index may range for either configuration from 0 to 3, and the second symbol index for either configuration may range from 10 to 13.

The apparatus may include additional components that perform each of the blocks of the algorithm in the aforementioned flowcharts of FIGS. 9A-B. As such, each block in the aforementioned flowcharts of FIGS. 9A-B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
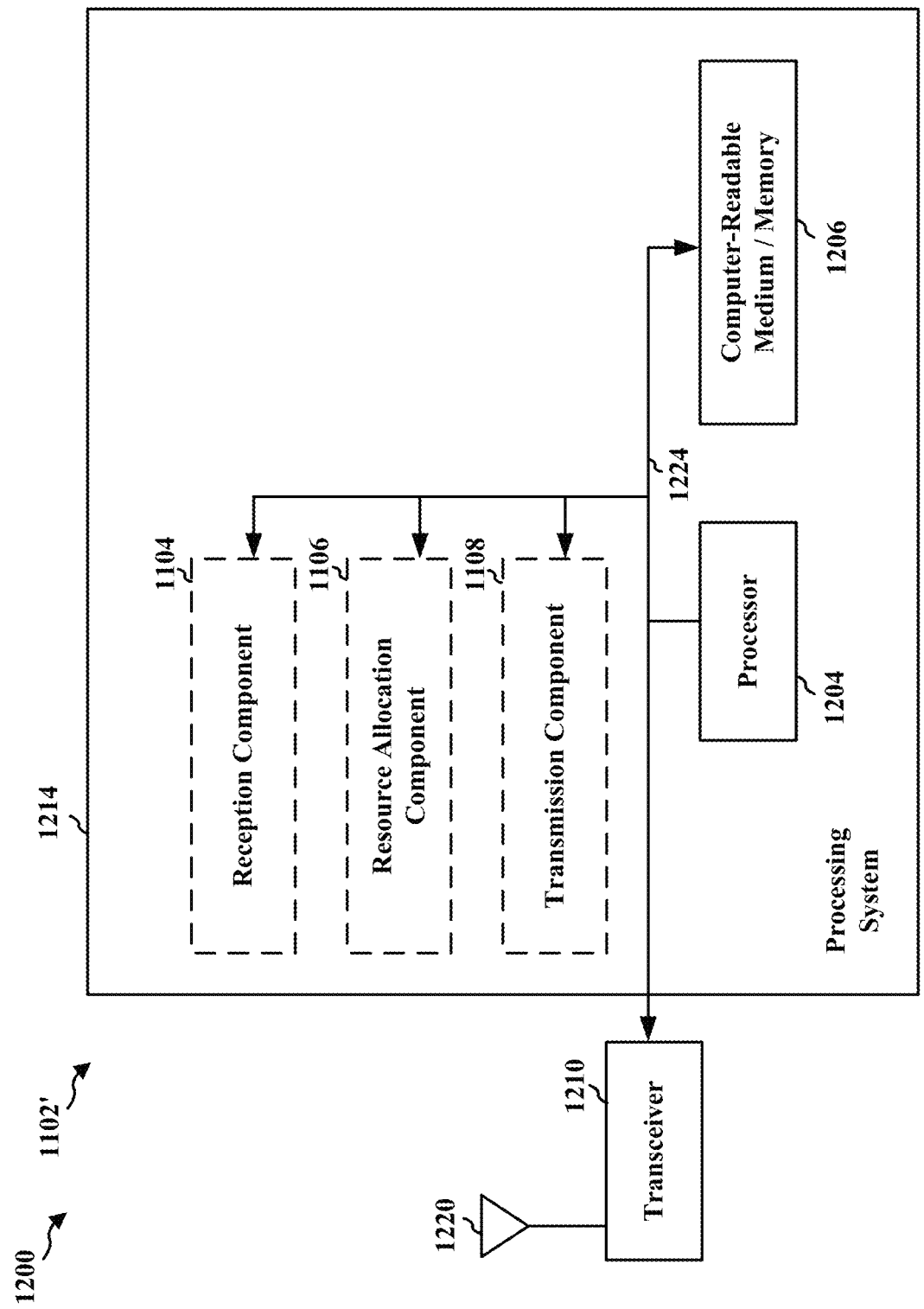
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1108, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375.

In one configuration, the apparatus 1102/1102' for wireless communication includes means for determining a first symbol index and a second symbol index associated with downlink resources allocated to a UE. The first symbol index may indicate when the downlink resources begin in a subframe, and the second symbol index may indicate when the downlink resources end in the subframe. The apparatus may include means for transmitting an indication of the first symbol index and the second symbol index to the UE. In an aspect, the downlink resources may be associated with a PDSCH that is dynamically scheduled via a PDCCH. In another aspect, the PDCCH may be transmitted in a directional manner. In another aspect, the PDCCH may be UE-specific. In another aspect, the first symbol index and the second symbol index may be the respective start and stop symbol indices of the PDSCH located in a same subframe on which the PDCCH was transmitted. In another aspect, the first symbol index and the second symbol index may be the respective start and stop symbol indices of the PDSCH located in the subframe that follows a previous subframe on which the PDCCH was transmitted. In another aspect, the first symbol index and the second symbol index are transmitted via the PDCCH within a DCI message. The DCI message may be of a format that includes start and stop symbol indices for the PDSCH.

In another configuration, the apparatus may include means for determining a first symbol index and a second symbol index associated with uplink resources allocated to a UE. The first symbol index may indicate when the uplink resources begin in a subframe and the second symbol index may indicate when the uplink resources end in the subframe. The apparatus may include means for transmitting an indication of the first symbol index and the second symbol index to the UE. In an aspect, the uplink resources may be associated with a PUSCH that is dynamically scheduled via a PDCCH. The PDCCH may be transmitted in a directional manner and may indicate the first symbol index and the second symbol index. In another aspect, the first symbol index and the second symbol index may be the respective start and stop symbol indices of the PUSCH located in a same subframe on which the PDCCH was transmitted. In another aspect, the first symbol index and the second symbol index may be the respective start and stop symbol indices of the PUSCH located in the subframe that follows a previous subframe on which the PDCCH was transmitted. In another aspect, the first symbol index and the second symbol index may be indicated via the PDCCH within a DCI message. The DCI message may be of a format that indicates start and stop symbol indices for the PUSCH. In another aspect, the indication of the first symbol index and the second symbol index may be transmitted via RRC signaling. In an aspect, the first symbol index may range for either configuration from 0 to 3, and the second symbol index for either configuration may range from 10 to 13. In another configuration, the apparatus may include means for transmitting a PDCCH that indicates a symbol index on which a DMRS is to be transmitted. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
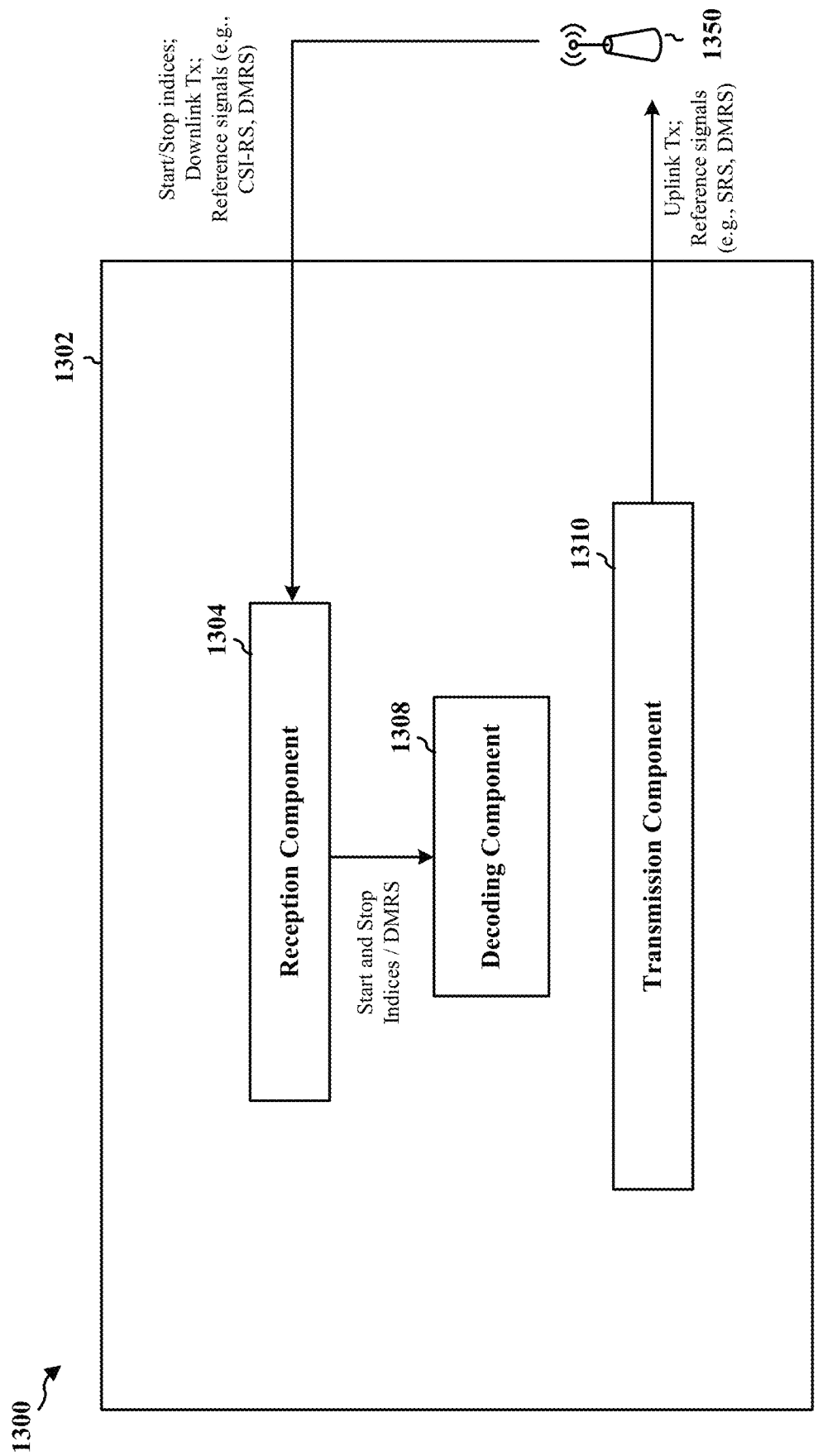
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE. The apparatus includes a reception component 1304, a decoding component 1306, and a transmission component 1308. The reception component 1304 may be configured to receive an indication of a first symbol index and a second symbol index associated with downlink resources allocated by a base station 1350 to the apparatus. The first symbol index may indicate when the downlink resources begin in a subframe, and the second symbol index may indicate when the downlink resources end in the subframe. The reception component 1304 may be configured to receive data from the base station 1350 based on the received first symbol index and the received second symbol index. In an aspect, the downlink resources may be associated with a PDSCH that is dynamically scheduled via a PDCCH. In another aspect, the PDCCH may be received in a directional manner. In another aspect, the PDCCH may be UE-specific. In another aspect, the first symbol index and the second symbol index may be the respective start and stop symbol indices of the PDSCH located in a same subframe on which the PDCCH was received. In another aspect, the first symbol index and the second symbol index may be the respective start and stop symbol indices of the PDSCH located in the subframe that follows a previous subframe on which the PDCCH was received. In another aspect, the first symbol index and the second symbol index may be received via the PDCCH within a DCI message, and the DCI message may be of a format that includes start and stop symbol indices for the PDSCH (e.g., as one or more bits within a symbol indices field).

In another configuration, the reception component 1304 may be configured to receive an indication of a first symbol index and a second symbol index associated with uplink resources allocated by a base station. The first symbol index may indicate when the uplink resources begin in a subframe and the second symbol index may indicate when the uplink resources end in the subframe. The transmission component 1310 may be configured to transmit data to the base station based on the first symbol index and the second symbol index. In an aspect, the uplink resources may be associated with a PUSCH that is dynamically scheduled via a PDCCH, and the PDCCH may be transmitted in a directional manner. In another aspect, the first symbol index and the second symbol index may be the respective start and stop symbol indices of the PUSCH located in a same subframe on which the PDCCH was received. In another aspect, the first symbol index and the second symbol index may be the respective start and stop symbol indices of the PUSCH located in the subframe that follows a previous subframe on which the PDCCH was received. In another aspect, the indication of first symbol index and the second symbol index may be received via the PDCCH within a DCI message, and the DCI message may be of a format that indicates start and stop symbol indices for the PUSCH. In another aspect, the first symbol index ranges from 0 to 3, and the second symbol index ranges from 10 to 13.

The apparatus may include additional components that perform each of the blocks of the algorithm in the aforementioned flowcharts of FIGS. 10A-B. As such, each block in the aforementioned flowcharts of FIGS. 10A-B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
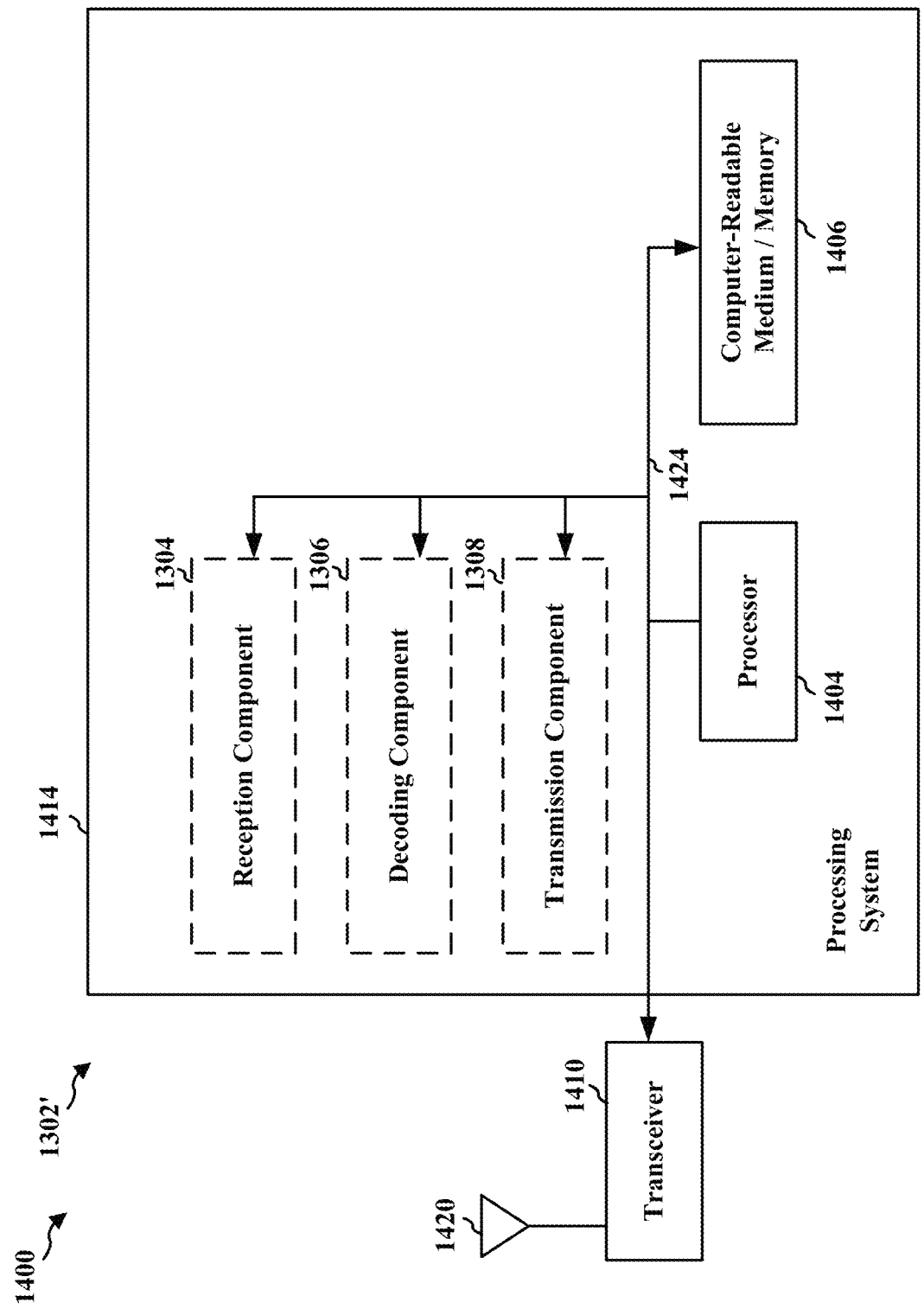
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1308, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406.

The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for receiving a first symbol index and a second symbol index associated with downlink resources allocated by a base station to the apparatus. The first symbol index may indicate when the downlink resources begin in a subframe, and the second symbol index may indicate when the downlink resources end in the subframe. The apparatus may include means for receiving data from the base station based on the received first symbol index and the received second symbol index. In an aspect, the downlink resources may be associated with a PDSCH that is dynamically scheduled via a PDCCH. In another aspect, the PDCCH may be received in a directional manner. In another aspect, the PDCCH may be UE-specific. In another aspect, the first symbol index and the second symbol index may be the respective start and stop symbol indices of the PDSCH located in a same subframe on which the PDCCH was received. In another aspect, the first symbol index and the second symbol index may be the respective start and stop symbol indices of the PDSCH located in the subframe that follows a previous subframe on which the PDCCH was received. In another aspect, the first symbol index and the second symbol index may be received via the PDCCH within a DCI message, and the DCI message may be of a format that includes start and stop symbol indices for the PDSCH (e.g., as one or more bits within a symbol indices field).

In another configuration, the apparatus may include means for receiving an indication of a first symbol index and a second symbol index associated with uplink resources allocated by a base station. The first symbol index may indicate when the uplink resources begin in a subframe and the second symbol index may indicate when the uplink resources end in the subframe. The apparatus may include means for transmitting data to the base station based on the first symbol index and the second symbol index. In an aspect, the uplink resources may be associated with a PUSCH that is dynamically scheduled via a PDCCH, and the PDCCH may be transmitted in a directional manner. In another aspect, the first symbol index and the second symbol index may be the respective start and stop symbol indices of the PUSCH located in a same subframe on which the PDCCH was received. In another aspect, the first symbol index and the second symbol index may be the respective start and stop symbol indices of the PUSCH located in the subframe that follows a previous subframe on which the PDCCH was received. In another aspect, the indication of first symbol index and the second symbol index may be received via the PDCCH within a DCI message, and the DCI message may be of a format that indicates start and stop symbol indices for the PUSCH. In another aspect, the first symbol index ranges from 0 to 3, and the second symbol index ranges from 10 to 13. In another configuration, the apparatus may include means for receiving a PDCCH that indicates a symbol index on which a DMRS is to be received. In another configuration, the apparatus may include means for decoding the received data based on the first symbol index, the second symbol index, the symbol index associated with the DMRS, and the DMRS. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication used in a millimeter wave (mmW) network, comprising:
utilizing a downlink frame structure from a number of preconfigured downlink frame structures for mmW transmissions, wherein each downlink frame structure of the number of preconfigured downlink frame structures has a different range of symbol indexes allocated as available downlink resources for downlink control;
determining a first symbol index and a second symbol index associated with the utilized downlink frame structure to be allocated to a user equipment (UE), the first symbol index indicating when downlink resources begin in a subframe and the second symbol index indicating when the downlink resources end in the subframe, wherein the downlink resources are associated with a physical downlink shared channel (PDSCH), wherein the PDSCH is dynamically scheduled via a physical downlink control channel (PDCCH), and wherein the PDSCH is directional; and
transmitting, to the UE, an indication of the first symbol index and the second symbol index, wherein the first symbol index and the second symbol index are indicated within a downlink control information (DCI) message.

2. The method of claim 1, wherein the PDCCH is UE-specific and is transmitted in a directional manner.

3. The method of claim 1, wherein the first symbol index and the second symbol index are respective start and stop symbol indices of the PDSCH located in a same subframe on which the PDCCH was transmitted.

4. The method of claim 1, wherein the first symbol index and the second symbol index are respective start and stop symbol indices of the PDSCH located in a later subframe that follows a previous subframe on which the PDCCH was transmitted.

5. The method of claim 1, wherein the first symbol index and the second symbol index are indicated via the PDCCH within the downlink control information (DCI) message, and wherein the DCI message is of a format that indicates start and stop symbol indices for the PDSCH.

6. The method of claim 1, wherein the indication of the first symbol index and the second symbol index is transmitted via radio resource control (RRC) signaling.

7. The method of claim 1, wherein the first symbol index ranges from 0 to 3, and the second symbol index ranges from 10 to 13.

8. The method of claim 1, wherein the PDCCH indicates a symbol index on which a demodulation reference signal (DMRS) is to be transmitted.

9. An apparatus of wireless communication at a base station, the apparatus comprising:
a transceiver;
a memory; and
one or more processors coupled to the memory and the transceiver,
the one or more processors being configured to:
utilize a downlink frame structure from a number of preconfigured downlink frame structures for millimeter wave (mmW) transmissions, wherein each downlink frame structure of the number of preconfigured downlink frame structures has a different range of symbol indexes allocated as available downlink resources for downlink control;
determine a first symbol index and a second symbol index associated with the utilized downlink frame structure to be allocated to a user equipment (UE), the first symbol index indicating when downlink resources begin in a subframe and the second symbol index indicating when the downlink resources end in the subframe, wherein the downlink resources are associated with a physical downlink shared channel (PDSCH), wherein the PDSCH is dynamically scheduled via a physical downlink control channel (PDCCH), and wherein the PDSCH is directional; and
transmit, to the UE, via the transceiver, an indication of the first symbol index and the second symbol index, wherein the first symbol index and the second symbol index are indicated within a downlink control information (DCI) message.

10. The apparatus of claim 9, wherein the PDCCH is UE-specific and is transmitted in a directional manner.

11. The apparatus of claim 9, wherein the first symbol index and the second symbol index are respective start and stop symbol indices of the PDSCH located in a same subframe on which the PDCCH was transmitted.

12. The apparatus of claim 9, wherein the first symbol index and the second symbol index are respective start and stop symbol indices of the PDSCH located in a later subframe that follows a previous subframe on which the PDCCH was transmitted.

13. The apparatus of claim 9, wherein the first symbol index and the second symbol index are indicated via the PDCCH within the downlink control information (DCI) message, and wherein the DCI message is of a format that indicates start and stop symbol indices for the PDSCH.

14. The apparatus of claim 9, wherein the indication of the first symbol index and the second symbol index is transmitted via radio resource control (RRC) signaling.

15. The apparatus of claim 9, wherein the first symbol index ranges from 0 to 3, and the second symbol index ranges from 10 to 13.

16. The apparatus of claim 9, wherein the PDCCH indicates a symbol index on which a demodulation reference signal (DMRS) is to be transmitted.

17. A method of wireless communication used in a millimeter wave (mmW) network, comprising:
utilizing an uplink frame structure from a number of preconfigured uplink frame structures for mmW transmissions, wherein each uplink frame structure of the number of preconfigured uplink frame structures has a different range of symbol indexes allocated as available uplink resources for uplink control;
determining a first symbol index and a second symbol index associated with the utilized uplink frame structure to be allocated to a user equipment (UE), the first symbol index indicating when uplink resources begin in a subframe and the second symbol index indicating when the uplink resources end in the subframe, wherein the uplink resources are associated with a physical uplink shared channel (PUSCH) that is dynamically and directionally scheduled via a physical downlink control channel (PDCCH); and
transmitting, to the UE, an indication of the first symbol index and the second symbol index, wherein the first symbol index and the second symbol index are indicated within a downlink control information (DCI) message.

18. The method of claim 17, wherein the PDCCH is transmitted in a directional manner and indicates the first symbol index and the second symbol index.

19. The method of claim 17, wherein the first symbol index and the second symbol index are respective start and stop symbol indices of the PUSCH located in a same subframe on which the PDCCH was transmitted.

20. The method of claim 17, wherein the first symbol index and the second symbol index are respective start and stop symbol indices of the PUSCH located in a later subframe that follows a previous subframe on which the PDCCH was transmitted.

21. The method of claim 17, wherein the first symbol index and the second symbol index are indicated via the PDCCH within the downlink control information (DCI) message, and wherein the DCI message is of a format that indicates start and stop symbol indices for the PUSCH.

22. The method of claim 17, wherein the first symbol index ranges from 0 to 3, and the second symbol index ranges from 10 to 13.

23. The method of claim 17, wherein the indication of the first symbol index and the second symbol index is transmitted via radio resource (RRC) signaling.

24. An apparatus of wireless communication at a base station, the apparatus comprising:
   a transceiver;
   a memory; and
   one or more processors coupled to the memory and the transceiver,
   the one or more processors being configured to:
      utilize an uplink frame structure from a number of preconfigured uplink frame structures for mmW transmissions, wherein each uplink frame structure of the number of preconfigured uplink frame structures has a different range of symbol indexes allocated as available uplink resources for uplink control;
      determine a first symbol index and a second symbol index associated with the utilized uplink frame structure to be allocated to a user equipment (UE), the first symbol index indicating when uplink resources begin in a subframe and the second symbol index indicating when the uplink resources end in the subframe, wherein the uplink resources are associated with a physical uplink shared channel (PUSCH) that is dynamically and directionally scheduled via a physical downlink control channel (PDCCH); and
      transmit, to the UE, via the transceiver, an indication of the first symbol index and the second symbol index, wherein the first symbol index and the second symbol index are indicated within a downlink control information (DCI) message.

25. The apparatus of claim 24, wherein the PDCCH is transmitted in a directional manner and indicates the first symbol index and the second symbol index.

26. The apparatus of claim 24, wherein the first symbol index and the second symbol index are respective start and stop symbol indices of the PUSCH located in a same subframe on which the PDCCH was transmitted.

27. The apparatus of claim 24, wherein the first symbol index and the second symbol index are respective start and stop symbol indices of the PUSCH located in a later subframe that follows a previous subframe on which the PDCCH was transmitted.

28. The apparatus of claim 24, wherein the first symbol index and the second symbol index are indicated via the PDCCH within the downlink control information (DCI) message, and wherein the DCI message is of a format that indicates start and stop symbol indices for the PUSCH.

29. The apparatus of claim 24, wherein the first symbol index ranges from 0 to 3, and the second symbol index ranges from 10 to 13.

30. The apparatus of claim 24, wherein the indication of the first symbol index and the second symbol index is transmitted via radio resource (RRC) signaling.

\* \* \* \* \*